United States Patent
Bar-Cohen et al.

(10) Patent No.: US 12,400,529 B2
(45) Date of Patent: Aug. 26, 2025

(54) SEALING DEVICE, SYSTEM, AND METHODS

(71) Applicant: Sojo Industries, Inc., Bristol, PA (US)

(72) Inventors: Barak Bar-Cohen, Bristol, PA (US);
Josh Schwartz-Dodek, Bristol, PA (US)

(73) Assignee: Sojo Industries, Inc., Bristol, PA (US)

( * ) Notice: Subject to any disclaimer, the term of this patent is extended or adjusted under 35 U.S.C. 154(b) by 0 days.

(21) Appl. No.: 18/915,817

(22) Filed: Oct. 15, 2024

(65) Prior Publication Data
US 2025/0124773 A1   Apr. 17, 2025

Related U.S. Application Data

(60) Provisional application No. 63/564,945, filed on Mar. 13, 2024, provisional application No. 63/590,911, filed on Oct. 17, 2023.

(51) Int. Cl.
| | |
|---|---|
| *G08B 13/12* | (2006.01) |
| *G06Q 10/0833* | (2023.01) |
| *H04W 4/029* | (2018.01) |
| *H04W 4/80* | (2018.01) |
| *H04W 12/03* | (2021.01) |

(52) U.S. Cl.
CPC ....... *G08B 13/126* (2013.01); *G06Q 10/0833* (2013.01); *H04W 4/029* (2018.02); *H04W 4/80* (2018.02); *H04W 12/03* (2021.01)

(58) Field of Classification Search
CPC . G08B 13/126; G06Q 10/0833; H04W 4/029; H04W 4/80; H04W 12/03
See application file for complete search history.

(56) References Cited

U.S. PATENT DOCUMENTS

| | | | |
|---|---|---|---|
| 2003/0220711 A1 | 11/2003 | Allen | |
| 2004/0041706 A1 | 3/2004 | Stratmoen et al. | |
| 2005/0231365 A1* | 10/2005 | Tester | G09F 3/0347 |
| | | | 292/307 R |
| 2008/0252084 A1 | 10/2008 | Francis et al. | |
| 2011/0221573 A1 | 9/2011 | Huat | |
| 2012/0144885 A1* | 6/2012 | Mills | E05B 39/005 |
| | | | 70/57.1 |
| 2013/0091905 A1* | 4/2013 | Brown | E05B 73/0017 |
| | | | 29/428 |
| 2018/0313111 A1 | 11/2018 | Park | |
| 2019/0043289 A1 | 2/2019 | Cahill | |
| 2020/0226954 A1* | 7/2020 | Sengstaken, Jr. | E05B 39/00 |

(Continued)

FOREIGN PATENT DOCUMENTS

| | | |
|---|---|---|
| WO | 2020033745 A1 | 2/2020 |
| WO | 2020039174 A1 | 2/2020 |

OTHER PUBLICATIONS

"Food Safety Modernization Act" (Jan. 4, 2011).

(Continued)

*Primary Examiner* — James J Yang
(74) *Attorney, Agent, or Firm* — Banner & Witcoff, Ltd.

(57) ABSTRACT

Aspects of the disclosure relate to sealing devices, methods, and systems. A sealing device may be configured to seal a container. The sealing device may send or trigger a message indicating the current geographic location of the sealing device based on the sealing device being removed from the container.

30 Claims, 10 Drawing Sheets

(56) References Cited

U.S. PATENT DOCUMENTS

2023/0177521 A1   6/2023   Leung et al.
2024/0214452 A1   6/2024   Skaaksrud

OTHER PUBLICATIONS

"Requirements for Additional Traceability Records for Certain Foods" (Nov. 21, 2022).
"Plastic Truck Seal" retrieved from [https://eadn-wc02-4961806.nxedge.io/wp-content/uploads/2017/09/Plastic-Truck-Seal-06-2023.pdf] on Oct. 9, 2024.
Jan. 27, 2025—(WO) International Search Report and Written Opinion—App PCT/US2024/051361.
Jul. 15, 2025—(US) Non-Final Office Action—U.S. Appl. No. 18/916,042.

* cited by examiner

SEALING DEVICE, SYSTEM, AND METHODS

CROSS-REFERENCE TO RELATED APPLICATIONS

This application claims priority to U.S. Provisional Patent Application No. 63/590,911 titled "Tracking Seal Device, System and Method" filed on Oct. 17, 2023, and claims priority to U.S. Provisional Patent Application No. 63/564,945 titled "Tracking Device, System and Method" filed on Mar. 13, 2024, each of which is incorporated by reference herein in its entirety.

FIELD

The present disclosures generally relate to sealing devices, more particularly relate to sealing devices for sealing containers, and more specifically relate to tamper-evident sealing devices configured to send a message indicating a location of the sealing device when the sealing device is opened after sealing a container.

BACKGROUND

Effective supply chain management may rely on the ability to track shipments from their point of departure to their destination. Shippers may also need cost-effective and reliable means to ensure shipments arrive at their intended destination securely or otherwise be notified in the event of unauthorized access or other tampering while in transit.

SUMMARY

The following summary present a general overview of various aspects of the present disclosures. This summary is not an extensive description of all aspects of the present disclosures and should not be understood to identify key or critical elements.

As noted above, aspects of this disclosure generally relate to tamper-evident sealing devices configured to send a message indicating a location of the sealing device when the sealing device is opened after sealing a container. The disclosures herein are presented, by way of example and without limitation, in the context of containers carrying cargo transported via various types of transports such as cars, trucks, trains, aircrafts, or boats between shippers and receivers. It should be appreciated, however, that the disclosures provided herein may be practiced for a variety of different types of containers whether or not transported and irrespective of the manner of transport.

A tamper-evident sealing device may be used to seal a container. In some examples, the sealing device includes a strap configured to loop through a lock or latch of a container such as a cargo trailer. The strap may include respective attachment ends that engage one another and lock in place. In some examples, the attachment ends of the strap are configured to irreversibly engage with one another such that detaching the attachment ends from each other destroys the engagement mechanism thereby preventing the attachments ends from reattaching. Example sealing devices disclosed herein, therefore, may be described as "single-use" sealing devices by virtue of their configuration that prevents reuse. For example, removing the sealing device may require cutting the strap or destroying the engagement mechanism.

A conductive element is embedded in the strap and electrically connected to a computer processor. The computer processor is configured to detect a break in the conductive element, for example, as a result of cutting the strap, disengaging the attachment ends, or otherwise disconnecting the sealing device. In this way, the conductive element and associated electronics may function as a "cut-off" sensor. The computer processor is also configured to cause information to be transmitted that indicates when and where the break in the conductive element occurred. For example, the transmitted information may include a unique identifier ("ID") of the sealing device, a current geographic location of the sealing device ("geolocation"), and a current date and time.

In some examples, the sealing device itself is configured to transmit a message with this information. For example, a sealing device may include a wireless receiver in signal communication with a Global Positioning System (GPS). Based on detecting a break in the conductive element, the computer processor may obtain from the GPS the current geolocation of the sealing device and the current date and time. The sealing device, in these examples, also includes a wireless transmitter and wirelessly transmits, via the wireless transmitter, a message with the sealing device ID, current geolocation, and current date and time. In these examples, the sealing device wirelessly transmits the message in one or more wireless signals according to a cellular network standard for delivery via a cellular network.

In other examples, the sealing device may rely on a mobile relay device to transmit the message with the sealing device ID, current geolocation, and current date and time. In these other examples, the sealing device may omit the wireless receiver in signal communication with the GPS and instead include only a processor and a wireless transmitter. Based on detecting a break in the conductive element, the processor may wirelessly transmit, via the wireless transmitter, a message indicating the break in the conductive element. In these examples, the sealing device wirelessly transmits the message in one or more wireless signals according to a short-range wireless standard for delivery to a mobile relay device that is within wireless range of the sealing device. For example, the mobile relay device may be a wireless mobile computing device being transported via the same transport sealed by the sealing device and configured for wireless communication via a cellular network. The mobile relay device may be configured to determine a current geographic location, for example, using its own wireless receiver in signal communication with a GPS. Based on detecting the message from the seal device, the mobile relay device may transmit the message with the sealing device ID, current geolocation, and current date and time in one or more wireless signals via the cellular network. In some other examples, the sealing device may include a wireless receiver in signal communication with the GPS and include the current geographic location (with or without the current date and time) in the message sent to the mobile relay device using the short-range wireless standard.

In some examples, a sealing device may be configured to transmit a message with an initial geolocation of the sealing device when the sealing device is attached to a container. In some examples, a sealing device may be configured to send during transport intermittent messages with the current geolocation of the sealing device after being attached to the container and before detecting a break in the conductive element.

In some examples, the sealing device may include a power source that facilitates its "single-use" nature. For example, the power source may include only enough power to ensure wireless transmission of a single message. In some examples, the power source may include enough power to ensure wireless transmission of a limited quantity of messages, for example, only enough power to ensure wireless transmission of a message to indicate an initial geolocation of the sealing device and a message to indicate a current geolocation of the sealing device following a break in the conductive element. In some examples, the power source may include enough power also to ensure wireless transmission of at least one message to indicate a current geolocation of the sealing device during transport. To facilitate the disposable nature of the sealing device, the power source may be, for example, an alkaline battery.

Information about the contents of a container also may be included in a message wirelessly transmitted by the sealing device or the mobile relay device. Such information may include, for example and among other things, the identity of the contents, the departure location, and the destination location. As described in further detail below, where the contents being transported include food or beverages, the message may include information about or otherwise associated with the food or beverage, for example and among other things, its source, quantity, and description. Sealing devices with track-and-trace capabilities as described herein thus provide a mechanism to record and identify entities that manufacture, process, pack, or hold food and beverages across the food and beverage supply chain.

Aspects of the disclosure also describe a system to track and trace containers sealed using the sealing devices described herein. As described in further detail below, example implementations of a track-and-trace system are configured to create and store records corresponding to events associated with the sealing devices. Such events include, for example, when the seal device was installed and when the seal device was removed. A track-and-trace system may store the records of such events in a distributed ledger such as a public blockchain. Using a distributed ledger may provide an immutable and trustworthy history for the contents of the containers sealed using the sealing devices. A track-and-trace system may also provide an interactive dashboard that is configured to, among other things, view and query records related to sealing devices and associated cargo shipments, view and manage alerts associated with sealing devices, and manage cargo shipments as they are transported between shippers and receivers.

These features and advantages, as well as others, are described in further detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
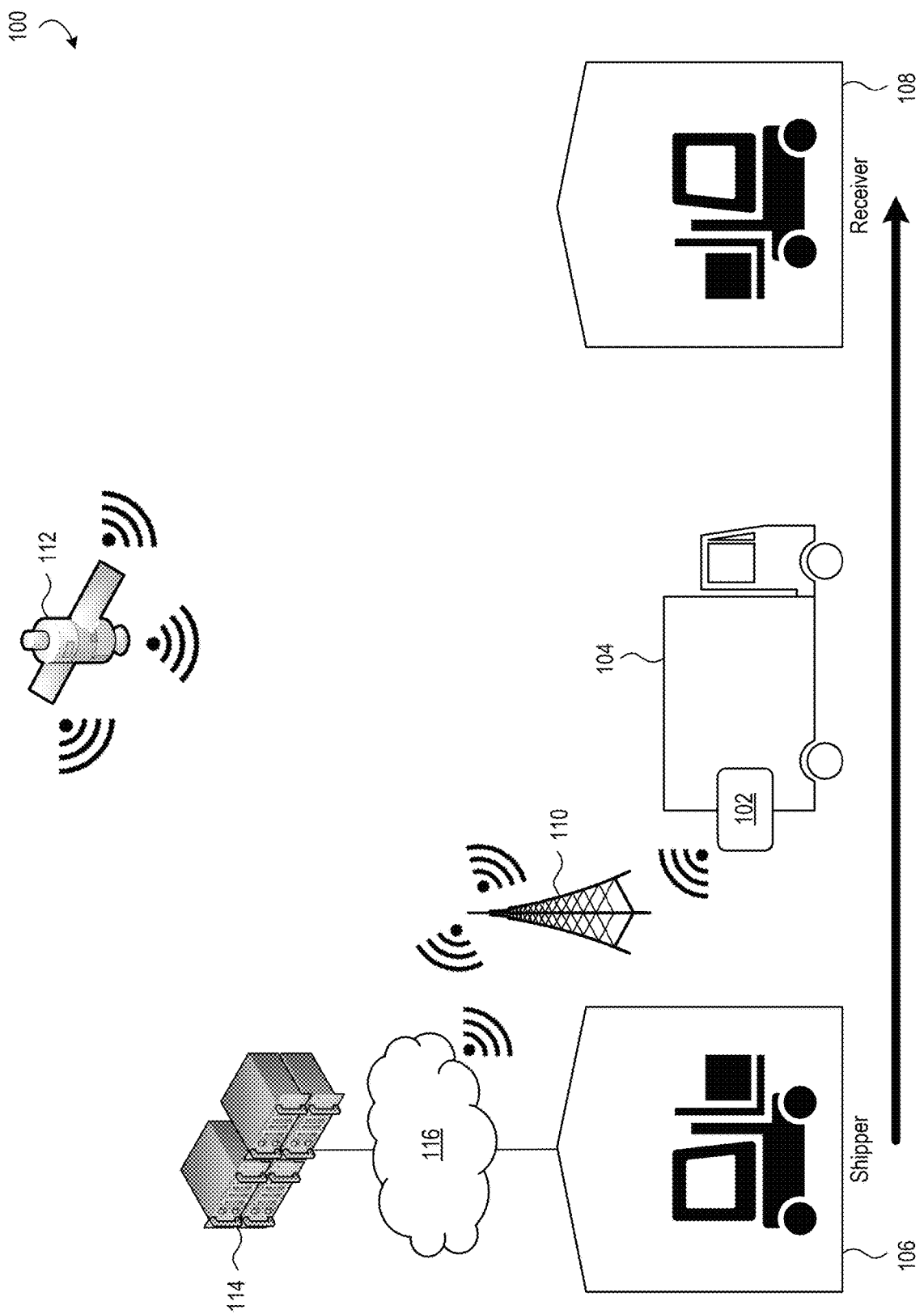
FIG. 1 depicts a diagram of an example track-and-trace system according to various aspects described herein.

In the following description, reference is made to the accompanying drawings, which form a part hereof, and in which is shown by way of illustration various examples in which the disclosure may be practiced. It is to be understood that other examples may be utilized and implemented whereby structural and functional modifications may be made without departing from the scope and spirit of the present disclosure. Further, headings within this disclosure should not be considered as limiting aspects of the disclosure. Those skilled in the art with the benefit of this disclosure will appreciate that the examples are not limited to the headings.

Track and trace devices are used in logistics, supply chain management, and the shipping industry to assure that cargo safely reaches its destination. This provides several key benefits, including enhanced security, improved accountability, reduced risk of loss, faster response to issues, quality control, regulatory compliance, data for process optimization, improved customer service, reduced insurance costs, real-time decision-making, theft deterrence, geographical awareness, sustainability and asset protection.

More specifically, real-time monitoring allows for immediate detection of tampering or unauthorized access to the cargo. This helps to prevent theft, damage, or tampering with valuable goods during transit. With real-time tracking, both the sending and receiving entity can hold each other accountable for the cargo's condition and security. Knowing that cargo is being monitored in real-time also deters potential thieves or dishonest employees, reducing the risk of cargo loss and resulting in cost savings for businesses. Real-time data allows for swift responses to incidents such as tampering, accidents, or delays, mitigating potential damage and minimize disruptions to the supply chain. For cargo that requires specific environmental conditions, real-time monitoring ensures these conditions are maintained, critical for products such as pharmaceuticals, perishable goods, and high-value electronics.

The data collected during transit can further be analyzed to identify patterns and opportunities for improvement in the supply chain. This can lead to more efficient operations, reduced costs, and improved customer satisfaction, while providing logistics and supply chain managers data to make informed, real-time decisions. This includes rerouting shipments in case of delays or security threats. Real-time tracking provides a clear understanding of where the cargo is at any given time, which can be particularly useful in large-scale global supply chains. Efficient supply chain management helps reduce fuel consumption, emissions, and overall environmental impact by minimizing unnecessary stops and delays.

Conventional tamper-evident sealing devices currently available may be configured to provide evidence of tampering via physical damage that is visible upon inspection of the sealing device. Such conventional sealing devices, however, may be limited in their functionality. For example, although conventional sealing devices may provide visual evidence of tampering, they may provide no indication of when and where such tampering occurred. As such, the industry would benefit from a low-cost sealing device that is single use, disposable, and provides track-and-trace capabilities. Low-cost, single-use, and disposable sealing devices with track-and-trace capabilities would be particularly useful and advantageous to, among other things, ensure a secure chain of custody between a shipper and receiver, provide real-time alerts of unauthorized access to the cargo, and facilitate the maintenance of shipping records indicating when and where the sealing devices were installed to secure the cargo and when and where the sealing devices were removed providing access to the cargo. The disclosures provided herein address these needs of enhancing indications of tampering.

The sealing devices described herein also provide improvements to the supply chain, including the food and beverage supply chain. As products move through the supply chain, conventional methods of reacting or recalling can be inefficient or ineffective. For variety packs and multi-packs, in particular, if a singular product for the variety pack or multi-pack is recalled, tracking its location and status can be challenging. A recalled product may be, for example, in preproduction storage, in production, out for delivery, delivered in-store and sometimes all of the above at various locations throughout the country such as warehouses, manufacturing facilities, in-transit, and retail store locations. As one example, many brands do not control their own supply chain. That is, many brands do not own their manufacturing, packaging, warehousing, freight, or distribution resulting in little visibility into what happens to their products between its origin and destination. As such, many brands heavily rely on daily reports related to production output, finished goods inventory, freight pickup fulfillment and arrival status at retail outlets, among other daily logistical challenges. Many brands, therefore, have limited means of validating and verifying milestones throughout these processes, which creates challenges in making critical decisions based on comprehensive and accurate information. For example, it may be cost-prohibitive for brands to invest in high-cost reusable tracking tags given that they typically do not own the transports or employ the transport operators. The disclosures herein of a low-cost, disposable sealing device with tracking and tracing capabilities also address these needs of tracking and tracing products (e.g., food and beverage products) as they move through the supply chain. By improving the ability to track and trace products as they move through the supply chain, brands, copackers, and other entities along the supply chain can more effectively manage product recalls and product holds and can more effectively fulfill regulatory requirements.

For example, changes to food safety regulations are expected to impose additional requirements on entities along the food and beverage supply chain. For example, the Food Safety Modernization Act aims to shift the focus from responding to foodborne illness to preventing it. New food traceability rules are expected to require that entities along the food and beverage supply chain maintain records containing key data elements ("KDEs") associated with specific critical tracking events ("CTEs") in order to provide information to the regulatory entities such as the United States Food and Drug Administration ("FDA") within some reasonable time (e.g., within 24 hours). For example, Food traceability rules are expected to impose traceability record-keeping requirements for entities that manufacture, process, pack, transport, or holds food and beverages including any listed on a food transport list ("FTL"). CTEs may include, for example, harvesting, cooling, initial packing, first land-based receipt, shipping, receiving, and transformation. KDEs may include, for example, a unique traceability lot code ("TLC"), the quantity and unit of measure for the food or beverage, a description of the food or beverage, a description of the location of an immediately subsequent receiver of the food or beverage, a description of the location of an immediately preceding shipper of the food or beverage, the shipment date, a reference to or a description of the location of the source of the TLC. Food traceability rules are expected to require KDEs to be linked to the food or beverage product at each CTE. Furthermore, TLCs are expected to be required for certain types of CTEs such as, for example, packing a raw agricultural commodity, receiving food from a fishing vessel during a first land-based receipt, and transforming a food. Food traceability rules are expected to require that traceability records for each CTE include the relevant TLC assigned to the food or beverage product. The disclosures herein of maintaining records based on messages sent from low-cost, disposable sealing devices with tracking and tracing capabilities further address these needs of fulfilling regulatory requirements related to traceability record-keeping and providing timely reports on the shipping, receiving, and transformation of products moving through the supply chain. As one example, when a food, beverage, or ingredient is indicated as compromised, individual products containing that ingredient may be promptly identified and tracked via the TLC assigned to those products and the corresponding traceability records maintained for the CTEs associated with those products.

The track-and-trace systems described herein also provide improvements over traditional recordkeeping for products moving through the supply chain. As described herein, a distributed ledger is used to store traceability records, which immutably logs CTEs and associated KDEs in a manner that ensures its privacy, security, accuracy, validity, and reliability. This immutability of the traceability records thus gives confidence to regulatory entities such as the FDA in the validity of the information contained those records. Using a distributed ledger to store CTEs and KDEs in immutable traceability records also provides safeguards against data manipulation or alteration by bad actors.

The track-and-trace systems described herein further provide improvements to traceability records for products that are combined into a collective whole. As one example, products with individually assigned TLCs may be transformed by packaging or repackaging them into a variety pack or multi-pack. As another example, commodities sourced from different suppliers (e.g., fruits, vegetables, fish, meat, and the like) may be assigned individual TLCs before being combined into a new product during a transformation process along the supply chain. As described in further detail below, the track-and-trace systems described herein are configured to combine TLCs associated with products combined during a transformation process that allows tracking and tracing CTEs and KDEs for both the combined result and its individual subcomponents.

Turning now to FIGS. 1-9, various aspects associated with sealing devices and track-and-trace systems are described. It is to be understood that the figures and descriptions of the present disclosure have been simplified to illustrate elements that are relevant for a clearer comprehension of the claimed subject matter. Those of ordinary skill in the art may recognize, with the benefit of this disclosure, that other elements may be provided and/or that other steps may be performed when implementing aspects of the present disclosure. The disclosure herein is directed to all such variations and modifications to such elements and methods recognized by those skilled in the art with the benefit of this disclosure.

FIG. 1 shows a diagram of an example of an implementation of a track-and-trace system 100. A sealing device 102 is used to secure a transport 104 carrying cargo between a shipper 106 and a receiver 108. In this example, the sealing device 102 is configured to transmit one or more messages via a cellular network 110 using one or more cellular network standards (e.g., LTE, 4G, 5G, 6G, etc.). As described herein, the sealing device 102 is configured to transmit the messages based on transitioning between an open state and a closed state, for example, from an open state to a closed state and/or from a closed state to an open state. The sealing device 102 transitions from an open state to a closed state when used to seal a container (e.g., when loading the cargo into the container at the shipper 106). For example, as described herein, a sealing device such as sealing device 102 may include a strap that loops through a lock or latch of the container and attaches at opposing attachment ends. The sealing device 102 is configured to detect the attachment of the strap's attachment ends and send a message based on that attachment. Similarly, the sealing device 102 transitions from a closed state to an open state when removed from the container (e.g., when the unloading the cargo from the container at the receiver 108). As another example, as described herein, a sealing device such as sealing device 102 may be a single-use sealing device that cannot be reattached once removed. Removing the sealing device 102 may require cutting the strap or disengaging the attachment ends in a manner that destroys an engagement mechanism thereby preventing reattachment. The sealing device 102 is configured to detect removal of the strap, for example, either by cutting the strap or detaching the strap's attachment ends and is configured to send a message based on that removal. The sealing device 102 also may be configured to intermittently (e.g., periodically) send messages during transit between the shipper 106 and the receiver 108. The messages sent by the sealing device 102 may be referred to as digital "pings" in some examples. As also described herein, in some examples, the sealing device 102 also may be configured to receive one or more messages via the cellular network 110 using a cellular network standard.

In some examples, such as the example track-and-trace system 100 shown in FIG. 1, the message sent by the sealing device 102 includes an indication of the identity of the sealing device 102, an indication of the current geolocation of the sealing device, and the current date and time (e.g., a timestamp). The identity of the sealing device may be indicated using a unique device ID. To send the current geolocation, the sealing device 102 is in signal communication with a geographical positioning system 112 such as a Global Navigation Satellite System (GNSS). The geographical positioning system 112 may provide the current geolocation of the sealing device 102 as a pair of geographical coordinates (e.g., a latitude value and a longitude value). The geographical positioning system 112 also may provide, along with the current geolocation, the current date and time. In some examples, the sealing device 102 may obtain the current date and time from an internal digital clock. In some examples, the message may include additional information such as, for example, information about the cargo sealed in the container (e.g., product data), information about the transport transporting the container (e.g., vehicle data), and/or information about the shipment (e.g., origin, destination).

The message from the sealing device 102 sent via the cellular network 110 may be delivered to a remote application server 114 via one or more networks 116. The networks 116 may include one or more wide area networks (WANs) such as the Internet. As described in further detail below, the application server 114 may receive and process the messages received from sealing devices such as sealing device 102. For example, the application server 114 may create and store records indicating the geolocation of the sealing device 102 and the date and time the sealing device transitioned between an open and closed state. In some examples, the application server 114 may be configured to send a message to the sealing device 102, which may be transmitted to the sealing device via the cellular network 110. As described further below, the message may be addressed to the sealing device and may be configured to cause the sealing device to wake from a sleep state and transmit a status message back to the application server 114 (e.g., via the cellular network 110). In this regard, one example of a message sent from the application server 114 to the sealing device 102 may be referred to, for convenience, as a "wake up" message.

Figure 2:
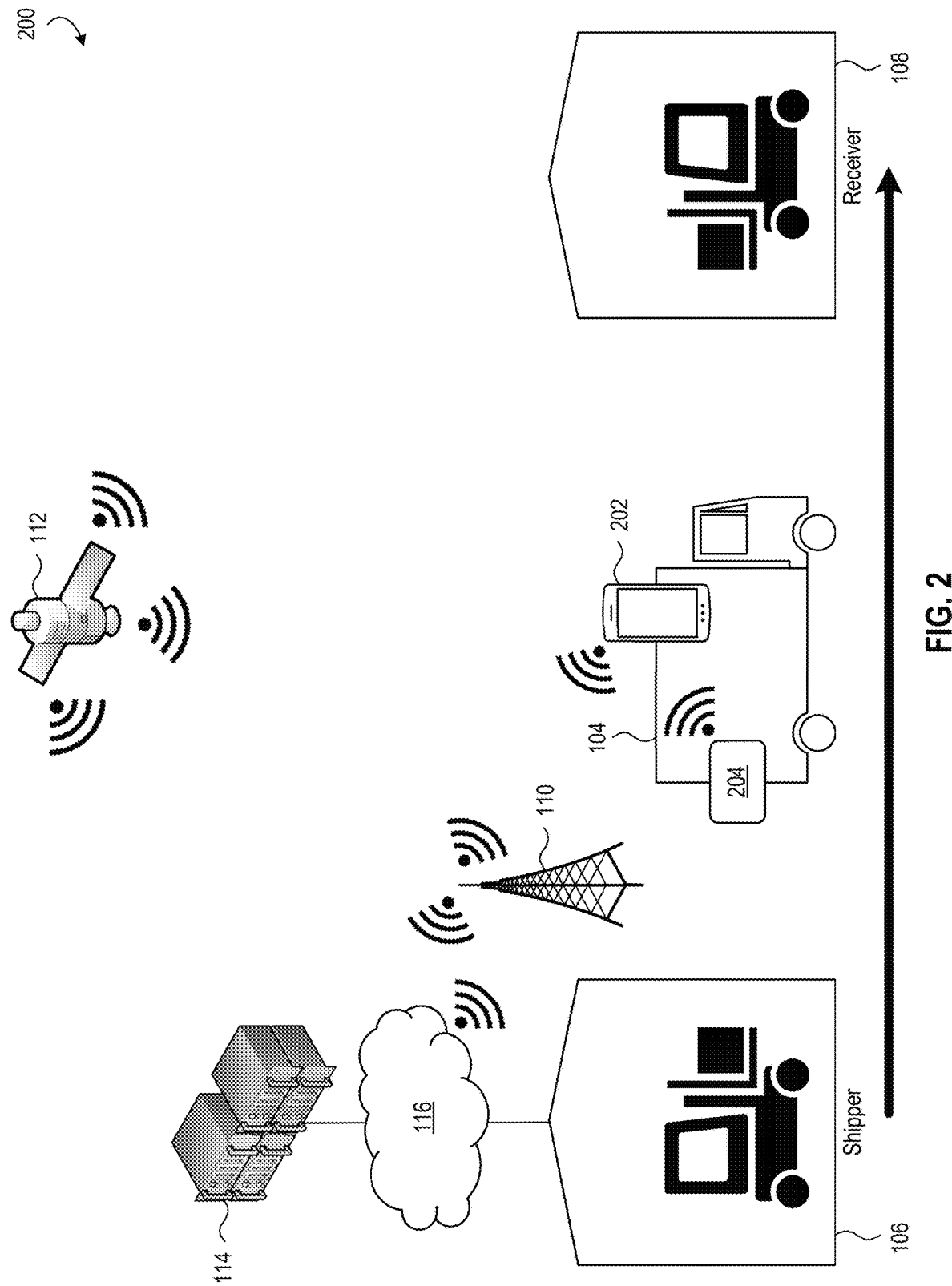
FIG. 2 depicts a diagram of another example track-and-trace system according to various aspects described herein.

FIG. 2 shows another example of an implementation of a track-and-trace system 200. In contrast to the track-and-trace system 100 of FIG. 1, the track-and-trace system 200 of FIG. 2 uses a mobile relay device 202 to send and receive the messages via the cellular network 110. In this example, the message sent by a sealing device 204 causes (e.g., triggers) sending of a message that includes the unique device ID, current geolocation of the sealing device, and the current date and time. In this regard, the sealing device 204 relies on the cellular networking capabilities of the mobile relay device 202 to send the message via the cellular network using a cellular network standard. The sealing device 204, in this example, is configured to send the message using a short range wireless communication standard (e.g., Bluetooth, Bluetooth Low Energy) to the mobile relay device 202. The mobile relay device 202 may be transported along with the sealing device 204 and thus within wireless range of the sealing device. The mobile relay device 202, in this example, is in signal communication with the geographical positioning system 112. Based on receiving a message from the sealing device 204, the mobile relay device 202 obtains the current geolocation from the geographical positioning system 112 and sends a message via the cellular network 110 using a cellular network standard. The message sent by the mobile relay device 202 may include the unique device ID of the sealing device 204, the current geolocation of the sealing device, and the current date and time. As noted above, the message sent by the mobile relay device 202 also may include information about the cargo, transport, or shipment. Given that the sealing device 204, in this example, relies on the mobile relay device 202 to obtain the current geolocation, the sealing device may exclude any communication interface configured for communication with the geographical positioning system 112. The message sent by the sealing device 204, in this example, thus may function as a simple trigger message that causes the mobile relay device 202 to send the message with the unique device ID, current geolocation, and current date and time ultimately delivered to the application server 114. In these examples, the message sent by the sealing device 204 thus may include the unique device ID of the sealing device but omit an indication of the geolocation and the current date and time. By omitting a communication interface configured for communication with the geographical positioning system 112, the sealing device 204 of FIG. 2 may be a more cost-effective solution than the sealing device 102 of FIG. 1 that is configured for communication with the geographical positioning system. In a similar fashion, the mobile relay device 202 is configured to relay messages sent from the application server 114 to the sealing device 204 (e.g., a "wake up" message). As noted above, the application server 114 may be configured to send a message to the sealing device 102, which may be transmitted to the mobile relay device 202 via the cellular network 110. The message sent by the application server 114 may be addressed to the mobile relay device 202 and configured to cause the mobile relay device to transmit a message to the sealing device 204 (e.g., using a short range wireless communication standard). The message transmitted by the mobile relay device may be configured to cause the sealing device to wake from a sleep state and transmit a status message back to the application server 114 and thus also may be referred to, for convenience, as a "wake up" message. The mobile relay device 202 may relay the status message sent by the sealing device 204 as described herein. In some examples, a mobile relay device may be configured to additionally or alternatively relay messages between a sealing device and a remotely located application server via a wireless local area network using a wireless networking standard (e.g., WiFi).

In some examples, the mobile relay device 202 may be, for example, a mobile cellular telephone (e.g., "smartphone") configured to listen for messages from the sealing device 204. For example, a mobile application may be installed at the mobile relay device 202 and execute at the mobile relay device during transport. In some examples, the mobile relay device 202 may be a computing device installed in or integrated at the transport and likewise configured to listen for messages from the sealing device 204. Additionally, in some examples, a relay device (not shown) may be installed at the premises of the shipper 106 and/or the receiver 108 and likewise configured to listen for messages sent by the sealing device 204 at the point of origin and at the destination.

Figure 3A:
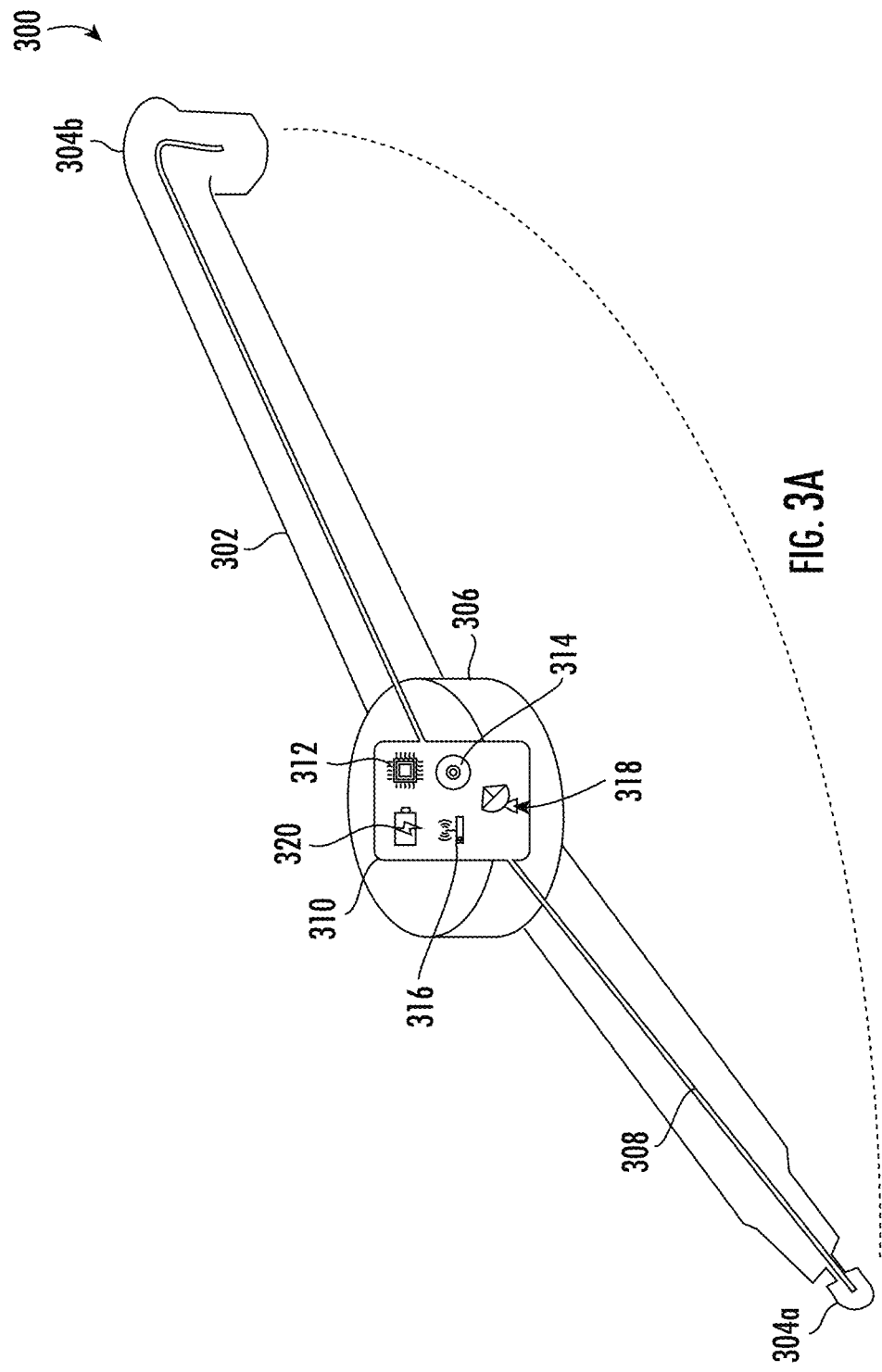
FIG. 3A depicts a diagram of an example sealing device according to various aspects described herein.

FIG. 3A shows a diagram of an example of a sealing device 300. The sealing device 300, in this example, includes a strap 302, respective attachment ends 304a and 304b, a housing 306, conductive element 308 extending along the strap, and electronics 310 contained within the housing. The conductive element 308 may be considered to be part of the electronics 310 of the sealing device 300. In some examples, the conductive element 308 may be embedded in the strap 302. In some examples, at least a portion of the electronics 310 may be embedded in the housing 306. For example, the electronics 310 of the example sealing device 300 include a processor 312, memory 314, a wireless communication interface 316, a global positioning communication interface 318, and a power source 320. As described herein, in some examples, a sealing device may omit a global positioning communication interface.

The strap 308, in this example, may be constructed of a variety of materials. For example, the strap 308 may be constructed of plastic, nylon, metal, or a combination of materials. The attachment ends 304a and 304b, in this example, are configured to engage with each other. In some examples, the attachment ends 304a and 304b are configured to irreversibly engage with each other. In this regard, the strap 308 may include an engagement mechanism that is destroyed or otherwise rendered inoperable upon detaching attachment ends from each other thereby preventing their reattachment. Such irreversible engagement may ensure a sealing device such as sealing device 300 cannot be removed without breaking (e.g., cutting) the strap 308 or destroying engagement mechanism that attaches the attachment ends 304a and 304b to each other. In some examples, the engagement mechanism may rely on friction and/or mechanical engagement that permits movement in one direction and prevents movement in the opposite direction. Example engagement mechanisms may include serrations (e.g., teeth, ridges, barbs) formed at (e.g., on) one attachment end with a locking tab at the opposite attachment end that permits the attachment end with the serrations to be fed into or through the opposite attachment end with the locking tab that prevents movement in a direction opposite the feed direction. This example engagement mechanism may be the same as or similar to those used to secure cable ties or zip ties. Example engagement mechanisms also may include a body formed at (e.g., on) one attachment end with a receptacle at the opposite attachment end whereby the body is press-fit into the receptacle and locked into place by one or more locking tabs within the receptacle that prevents the body from being pulled out of receptacle. This example engagement mechanism may be referred to as a ball-and-socket engagement mechanism. In these examples, detaching or attempting to detach the attachment ends may cause a mechanical failure in the sealing device (e.g., breaking the strap, destroying the engagement mechanism). Other examples of engagement mechanisms include wedge lock mechanisms, spring clip or spring tab locking mechanisms, push-pin locking mechanisms, and even adhesives. Those skilled in the art with the benefit of this disclosure will recognize and appreciate other types of engagement mechanisms that may be employed to attach the attachment ends of the strap of a sealing device including engagement mechanisms that render a sealing device to be a single-use sealing device as described herein.

As described in further detail below with reference to FIG. 3B, the conductive element 308 may form part of a circuit used to detect when the sealing device 300 transitions from an open (e.g., unused, disengaged) state to a closed (e.g., installed, engaged) state, when used to seal a container for example, and from the closed state to the open state, when removed (e.g., cut) from a sealed container. In some examples, the circuit of the sealing device may be open when the sealing device is in the open state, and the sealing device may be configured such that engaging the attachment ends closes the circuit. Upon closing the circuit, the sealing device may be activated such that removing the sealing device (e.g., by cutting the strap thereby severing the conductive element or disengaging the attachment ends) opens the circuit. Upon activating a sealing device, the processor 312 may monitor for a break in the circuit (e.g., a break in the conductive element) and send the message based on detecting the break. In some examples, removing the sealing device may cause a signal to be sent to the processor 312, and the processor may send the message based on receiving the signal.

The memory 314 may store executable instructions that may be processed and executed by the processor 312 to enable the track-and-trace functionality of the sealing device 300. Data associated with these track-and-trace operations also may be stored in the memory 314 and may be communicated to and/or captured by a remote application server (e.g., a hub such as a cloud-based IoT hub) as described herein. For example, information transmitted by the sealing device 300 may be captured by an Azure IoT hub. The executable instructions may be stored as firmware at the sealing device 300 in read-only memory.

In some examples, the memory 314 may store operational parameters and/or operational data associated with the sealing device 300, including information to uniquely identify the sealing device. For example, the memory 314 may store a device ID that may be established to uniquely identify each device and may include, for example, a serial number. In some examples, the memory 314 may store other data within an associated data structure such as cargo information (e.g., TLCs, a unique product-specific or shipment-specific reference number), driver information, origin information, destination information, routing information, vehicle information, and geographical information associated with a starting location, an ending location, route location information, and/or the like. As described in further detail below with reference to FIG. 4, a sealing device may be provisioned with this additional information during a provisioning process. Additionally or alternatively, this other data may be stored in an external database or external data store as described herein. In some examples, the memory 314 may store device authentication information that may be used to uniquely identify each sealing device (e.g., within an IoT network and/or an IoT hub, such as an Azure IoT hub). Authentication information may include symmetric keys, where each sealing device may be associated with two corresponding symmetric keys. The symmetric keys may be used to generate a token for authenticating messages transmitted by a sealing device. The memory 314 may also store security certificate information, such as an X.509 certificate that may be used to facilitate more robust security measures. As part of the X.509 standard specified by the International Telecommunication Union (ITU) that defines the format and content of public key certificates, key management operations may be handled on both the sealing device 300 itself and an external IoT hub. In some examples, the memory 314 may store tokens used with one or more token-based authentication processes. For example, the sealing device 300 may generate a shared access signature (SAS) token using its symmetric keys, where the token may be set to expire after a specified duration. By embedding these keys within the firmware or otherwise include the keys in the memory 314, the firmware libraries may be used to automate executable instructions customized and stored within the memory.

As also described in further detail below with reference to FIG. 3B, the sealing device 300, in this example, includes one or more wireless communication interfaces 316. The wireless communication interfaces 316 may include, for example, one or more of a wireless communication interface configured to communicate via a cellular network using one or more cellular network standards, a wireless communication interface configured to communicate via a short-range wireless network using one or more short-range wireless standards, and/or a wireless communication interface configured to communicate using any wireless communication standard. The sealing device 300 may use the wireless communication interface 316 to send and/or receive messages including, for example, messages with the unique device ID, current geolocation of the sealing device, and current date and time, messages that cause another device, such as a mobile relay device, to send the messages with this information on its behalf, and "wake up" messages and status messages as described herein.

As further described below with reference to FIG. 3B, the sealing device 300, in this example, includes a global positioning communication interface 318 configured to obtain the current geographic location of the sealing device. As described herein, in some examples, a sealing device may omit the global positioning communication interface 318 and instead rely on a global positioning communication interface of a mobile relay device to obtain the current geolocation of the sealing device.

As described above, the power source 320 may facilitate the single-use nature of the sealing device 300. For example, the power source 320 may be or otherwise include an alkaline battery to facilitate disposing or recycling the sealing device 300 once used. The power source 320 also may be configured to have limited capacity sufficient to send only one or a few messages, for example, an initial message upon engaging the attachment ends when sealing a container, a final message upon removal of the sealing device from a sealed container, and one or more intermediate messages sent during transit of the sealed container. In some examples, the processor 312 may be configured to minimize power consumption by utilizing a low-power sleep mode whereby the sealing device 300 enters the low-power sleep mode after sending the initial message upon activation, wakes from the low-power sleep mode to send one or more messages during transit before returning to the low-power sleep mode, and wakes a final time from the low-power sleep mode to send a final message upon removal of the sealing device.

Figure 3B:
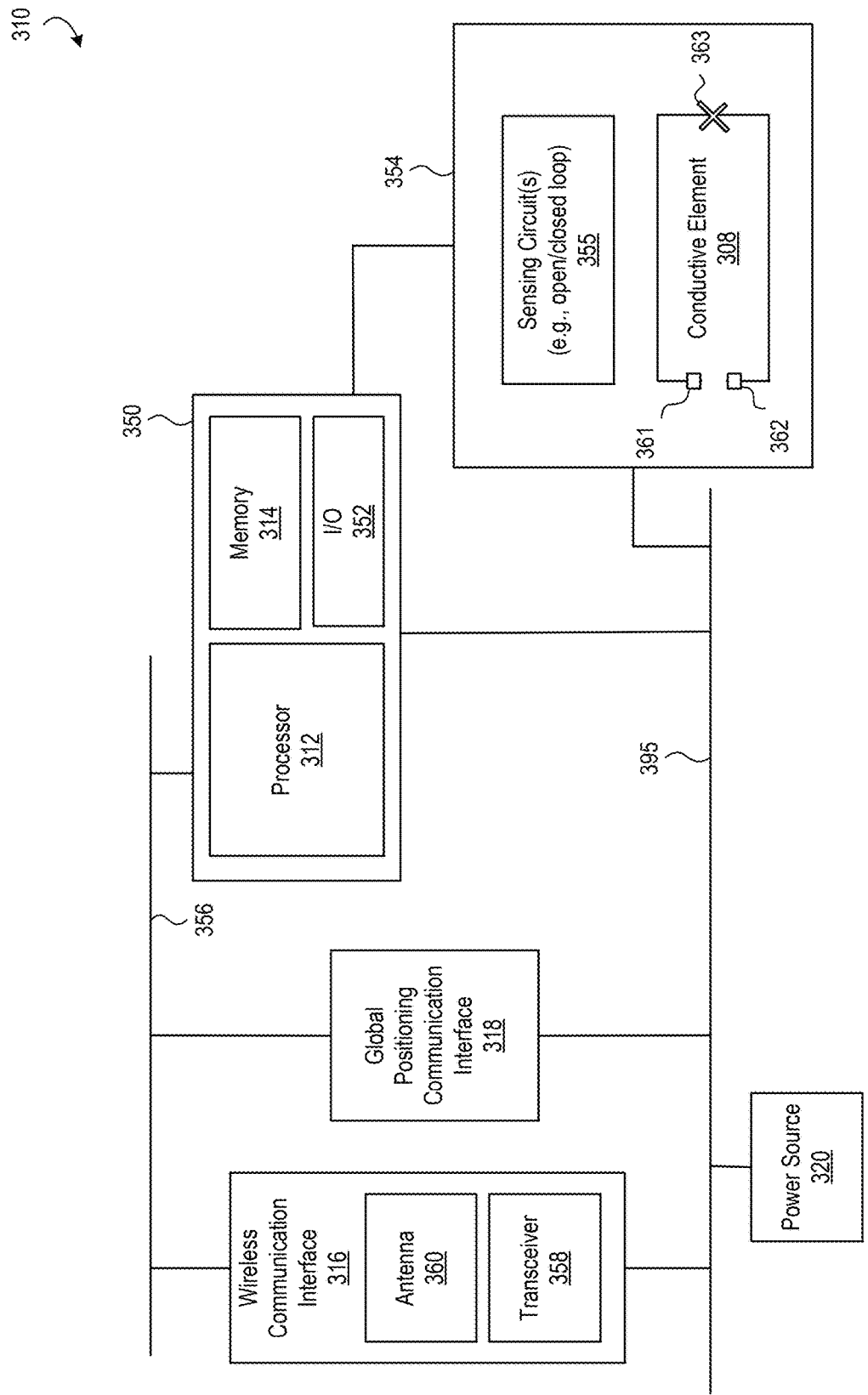
FIG. 3B depicts a block circuit diagram of the example sealing device of FIG. 3A.

FIG. 3B shows a block circuit diagram of the electronics 310 of the example sealing device 300 of FIG. 3A. As described above, the sealing device 300 may include a conductive element 308, a processor 312, memory 314, a wireless communication interface 316, a global positioning communication interface 318, and a power source 320. The processor 312 and memory 314 may form a controller circuit 350. The controller circuit 350 may include one or more inputs/outputs (I/O) 352. The conductive element 308 may be part of or otherwise connected to a detection circuit 354 used to detect removal of the sealing device 300 from a sealed container. As also described above, the electronics 310 may be embedded within, or otherwise incorporated into, a housing 306 (enclosure) of the sealing device 300 to facilitate real-time monitoring of a current status of the sealing device.

The electronics 310 of the sealing device 300 may include a circuit board having a flexible, semi-flexible, or rigid design, such as a rigid or semi-flexible printed circuit board (PCB) made from a glass reinforced epoxy laminate material (e.g., FR4), a flexible PCB made from a one or more flexible substrate materials, such as a polyimide material, a polyester material, a polyamide material, a fluoropolymer material, etc., and/or a combination of rigid, semi-rigid and/or flexible substrates. The substrate of the flexible PCB may utilize a copper foil for conductive portions and/or chip connection points, dielectric stiffening layers to reinforce certain areas of the PCB, adhesives to bond components to the substrate, overlays, and/or coatings to protect components of the electronics 310. Components, such as the controller circuit 350, the global positioning communication interface 318, the wireless communication interface 316, the detection circuit 354, may be composed on discrete components, a system on-a-chip, or a combination. In some cases, the sealing device 300 may be constructed as a flexible circuit board with a flexible tamper circuit tail having a flexible circuit board assembly (FCBA) or a printed circuit board assembly (PCBA) to house the electronic components and antenna. The electronics 310 of the sealing device 300 may utilize a flexible PCB, a semiflexible PCB, a rigid PCB, or a combination of flexible, semiflexible, or rigid PCB components.

As noted above, the controller circuit 350 of the sealing device 300 may include a processor 312, memory 314 (e.g., on-board memory, external memory, etc.), and I/O 352. For example, the controller circuit 350 may comprise a dedicated application processor with onboard memory, such as an Advanced Reduced Instruction Set Computer (RISC) Machine (ARM) processor (e.g., a 64 MHz ARM Cortex M33 central processing unit (CPU)) where the ARM processor may be configured to operate using a security enabled firmware code set (e.g., TrustZone technology), a security enabled mobile processor system (e.g., an ARM CryptoCell 310 for application layer security with, for example, 1 MB Flash and 256 KB RAM). In some cases, the processor 312 may support one or more identification modules, such as a Subscriber Identity/Identification Module (SIM) or an eSIM to support one or more wireless communication methods, such as wireless communication via a cellular network, wireless communication via an IoT network and/or the like. The controller circuit 350 may include multiple interfaces to support one or more input and/or output, such as the I/O 352. In some examples, the controller circuit 350 may support one or more analog-to-digital channels ADC, such as a 12-bit ADC. One or more interfaces supported by the controller circuit 350 may include, for example, a real-time clock (RTC) interface, a serial peripheral interface (SPI), a 12C interface, a 12S interface, a Universal Asynchronous Receiver/Transmitter with EasyDMA (UARTE), a pulse density modulation (PDM), a pulse width modulation (PWM) interface, and/or the like. The controller circuit 350 may utilize one or more interfaces as a communication bus 356 to communicate with one or more additional components of the sealing device 300, for example, the global positioning communication interface 318 and the wireless communication interface 316.

The sealing device 300 may be automatically enabled upon closing the seal (e.g., engaging the attachments end as described above). For example, the sealing device 300 may process instructions to periodically monitor a status of the sealing device 300 to identify when its status changes from an unused (disengaged) state to a sealed (engaged) state and from a sealed (engaged) state to an opened state (e.g., disengaged or severed state). Additionally, the sealing device 300 may process instructions to monitor or determine, in real time or near real time, a location of the sealing device at any point including, for example, during transit of cargo being transported in a container sealed by the sealing device (e.g., a cargo container or truck trailer). A break in the detection circuit 354 may be identified at any point during transit or at a facility (e.g., the receiver's facility). The sealing device 300 may be automatically enabled upon closing the seal without requiring hardware or other interaction by a user, such as at a distributor or an end customer site. As described herein, the sealing device 300 may utilize existing communication infrastructure to facilitate reliable wireless communication with the hub. For example, the controller circuit 350 may automatically process instructions to detect or otherwise respond to a change in the status of the sealing device in order to provide a quick response to the status change. As another example, the controller circuit 350 may be configured to intermittently (e.g., periodically) send a status message when utilizing a low-power mode (e.g., every x seconds, minutes, hours, days, etc.). In some examples, the controller circuit 350 may be configured to send message to a remote hub that include data captured around the time of the message in real-time, such as a status of the seal (e.g., open or closed), a geographic location of the sealing device, and a date and time. To conserve power, the sealing device 300 may sleep between the messages.

In some examples, the sealing device 300 may be configured to automatically send a message based on detecting a change of state of the sealing device, for example, from an open (e.g., unused state) to a closed (e.g., engaged or locked) state. Based on this transition, the sealing device 300 may automatically obtain and sends an indication of the geolocation of the sealing device. The sealing device 300 may include the device ID of the sealing device in the message. The sealing device 300 may send the message with or without the current date and time. The sealing device 300 may send the current date and time as a timestamp. In some examples, the sealing device 300 may be configured to cause transmission of the message with the geolocation of the sealing device, for example, using a mobile relay device as described herein. While the sealing device 300 is closed, the controller circuit 350 may process instructions to provide real-time, near real-time, and/or periodic updates of a current geolocation of the sealing device, to provide real-time tracking capability for an object sealed using the sealing device. For example, the controller circuit 350 may intermittently wake (e.g., every x seconds, minutes, hours, days, etc.) to obtain the current geolocation date, and time of the sealing device 300 and send a message (or otherwise cause a message to be sent) that includes the geolocation, date, and time via a communication network (e.g., a cellular network).

The controller circuit 350 may be configured to detect a transition from the closed state to the open state. The controller circuit 350 may detect the transition from the closed state to the open state, for example, based on opening the sealing device 300 (e.g., detaching the attachment ends) and cutting the sealing device thereby severing the conductive element 308. This state transition causes the controller circuit 350 to obtain the current geolocation of the sealing device 300, along with the current date and time, and automatically send a message (or cause a message to be sent) in real-time or near real time that includes an indication of the current geolocation where the opening event occurred. To ensure that the controller circuit 350 operates via secure communications, one or more secure communication measures may be used. For example, the secure communication measures may use private keys, public keys, and/or tokens to encrypt the data. In some examples, the security measures may include use of symmetric keys, certificates (e.g., x/509 certificates), token-based authentication measures, and/or the like.

The global positioning communication interface 318, may include one or more different chips or chipsets configured to provide indications of geolocations to the controller circuit 350. For example, global positioning communication interface 318 may comprise a global navigation satellite system (GNSS)-enabled chipset, such as a global positioning system (GPS) chipset, a quasi-zenith satellite system (QZSS) chipset, with or without assisted and/or predictive GNSS capabilities. Other GNSS-enabled chipsets may also be used depending on the geographic location where the sealing device is used, for example, a Globalnaya Navigazionnaya Sputnikovaya Sistema (GLONASS) chipset, a Galileo chipset, a BeiDou Navigation Satellite System (BDS) chipset, a Doppler Orbitography and Radiopositioning Integrated by Satellite (DORIS) chipset, an Indian Regional Navigation Satellite System (IRNSS) chipset, GNSS augmentation chipset, and the like. In some examples, the global positioning communication interface 318 may be configured to utilize service set identifier (SSID) Wi-Fi network location capabilities, such as by leveraging base station triangulation. In some examples, the global positioning communication interface 318 may include or be communicatively coupled to an antenna (e.g., a GPS antenna), not shown, such as a flexible polymer antenna configured for the particular geolocation chip set used, such as a GPS patch antenna, a flexible polymer multi-band GNSS GPS antenna, a flexible (flex) LTE antenna, Wi-Fi antenna, GNSS and the like. In one illustrative example, the global positioning communication interface 318 may be include a GPS chipset and a 2.4 GHz antenna.

The wireless communication interface 316 may include a communication chipset and an antenna, such as a transceiver 358 and an antenna 360, to facilitate wireless communication from the sealing device 300. In some examples, the wireless communication interface 316 may be or otherwise include a low-power cellular communication chipset, such as a lower power cellular IoT system-on-a-chip (SoC) or a Bluetooth low energy (BLE) SoC. In some examples, the wireless communication interface 316 may be configured for IoT network communication and may utilize a multimode chipset, for example, a multimode modem such as a combined Long-Term Evolution Machine (LTE-M)/Narrow Band (NB)-IoT modem with an integrated radio frequency (RF) front end. For example, the wireless communication interface 316 may include support over a particular communication band (e.g., 700-2,200 MHz LTE band support) at a specified output power level (e.g., +23 dBm). The wireless communication interface 316 also may comply with one or more certifications including from the Personal Communications Service (PCS) Type Certification Review Board (PTCRB), Federal Communications Commission (FCC), Industry Canada (IC), Conformite Europeenne (CE), and/or certifications as provided by other national or international certification organizations. In some examples, the components of the wireless communication interface 316 may be combined with one or more of global positioning communication interface 318 and/or the controller circuit 350, such as by using a cellular SoC with an onboard microcontroller, integrated memory, I/O, GNSS capabilities, and a power management integrated circuit (PMIC), a BLE-enabled SoC with an onboard microcontroller, memory, and I/O, and/or the like.

To facilitate determining whether the sealing device 300 is in an open or closed state, the controller circuit 350 may include or otherwise be in signal communication with the detection circuit 354. The detection circuit 354 may include one or more sensing circuits 355 and the conductive element 308. The sensing circuit(s) 355 may be configured to detect when the conductive element 308 forms a conductive connection to a second electrical connection point on the controller circuit 350 (e.g., resulting in a closed state) when the sensing device 300 is engaged to seal a container. The sensing circuits(s) 355 also may be configured to detect when the closed electrical connection formed by the conducive element 308 is opened or broken (e.g., a break or disconnect 463 to the conductive element 308), such as when the sealing device is disengaged or severed to access the sealed container. In some examples, the detection circuit 354 may comprise a continuity sensing circuit, such as a wire-break sensing circuit (e.g., a capacitor loop sensing circuit). In some examples, the sensing circuit(s) 355 may be or otherwise include an integrated circuit, a combination of discrete components, or a combination of integrated circuits and discrete components. In some examples, the sensing circuit(s) 355 may include a wire sensor, a magnet activated switch, a capacitive sensor, and/or the like.

The conductive element 308 may be formed from one or more conductive materials, such as stranded wire, a flexible or semi-flexible circuit trace, and/or the like. In some examples, the conductive element 308 may be formed of conductive materials that may be protected from accidental or incidental damage or breakage, such as by using protected stranded wire, or other by using conductor protective measures such as by integrating a reinforcing material, such as a metal mesh and/or the like. The conductive element 308 may include a proximal end 361 physically incorporated or otherwise conductively attached to a first connection point on the controller circuit 350 and a distal end 362 physically separate from controller circuit when the sealing device is in an unused (disengaged) state. When used to seal a container by engaging the attachment ends 304a and 304b, the sealing device 300 forms a single-use physical seal that forms a conductive connection between the connection point at the controller circuit 350 for the proximal end 361 of the conductive element 308 and the connection point at the controller circuit for the distal end 362 of the conductive element. In some examples, the electrical connection is formed by a physical and electrical connection between the distal end 362 of the conductive element 308 and an electrical connection point on the controller circuit 350 (e.g., wire continuity), such as via use of male/female electrical connectors. In some examples, the electrical connection may be formed via use of switches and/or relays activated via the proximity or connection of the distal end 362 to or near a component (e.g., a switch) on the controller circuit 350 PCB. For example, a component at or near the distal end 362 of the conductive circuit 308 may cause activation of a magnetic switch, a capacitive switch, a relay, and/or the like. In one illustrative example, the sensing circuit(s) 355 may be formed from discrete components including a capacitor in parallel to electrical connection points on the controller circuit 350 PCB associated with the proximal end 361 and the distal end 362 of the conductive element 308. Connecting the distal end 362 may cause current flow to charge the capacitor, where the controller circuit 350 may sense the transient current flow event via the I/O 352 to trigger obtaining the current geolocation and the current time and date when the sealing device 300 is engaged to seal a container. Similarly, removing the sealing device 300 (e.g., by disengaging the attachment ends or cutting the strap 302) and thus causing the break or disconnect 363 in the conductive element 308 may cause the capacitor to discharge. The controller circuit 350 may detect the transient current flow via the I/O 352 to likewise trigger obtaining the current geolocation and the current time and date when the sealing device 300 is opened or otherwise broken (e.g., the break or disconnect 363). Similar opening and/or closing events may be captured via use of switches and/or relays, where the closure of a magnetic and/or capacitive switch may cause current flow via a first electrical flow path that triggers a closure capture event by the controller circuit 350. Breaking the conductive element 308, for example, by opening or cutting the sealing device 300 causing the break or disconnect 363, may similarly cause current flow via a second electrical flow path that triggers the controller circuit 350 to obtain the current geolocation and the current time and date and send a message with this information or otherwise send a message that causes a mobile relay device to send the information as described herein. The examples discussed above are presented for illustrative purposes for detecting opening and/or closure events of the sealing device 300 and are not meant to be limited to only such examples.

The power source 320 may be or otherwise include a battery (e.g., an alkaline battery) and/or associated circuitry such as a power management circuit (not shown) and a power bus 395 capable of providing power from the power source 320 to one or more of the components of the controller circuit 350. The battery may be sized to provide power over a defined lifetime of the sealing device 300, such as to send messages (e.g., messages communicating geolocation and/or time and date information or message that cause a mobile relay device to send such information).

Because the sealing device 300 may be designed for single use, its components, including the battery, may be composed of disposable materials.

The sealing device 300 may be designed to operate to meet or exceed certain environmental or other operational requirements including, for example, environmental requirements set forth in one or more international standards, such as the Society of Automotive Engineers (SAE) J1455 Electronic Equipment Environmental Standards and/or others that characterize environmental performance and/or reliability of electronic equipment designed for heavy-duty on road and off-road vehicles, such as heavy trucks. Illustrative operational requirements may include an operating temperature requirement (e.g., between about −40° Celsius (C) to about 85° C.), a thermal shock requirement, a humidity requirement a salt spray requirement (e.g., American Society for Testing Materials (ASTM) B117), a steam cleaning/pressure washing requirement, a vibration requirement, a shock requirement, a water and/or dust ingress requirement (e.g., an International Protection (IP) rating such as IP 67).

In some examples, a sealing device may be configured to provide visual indications of successful connection with a cellular network and/or a global navigation satellite system. For example, upon activation, a sealing device may attempt to register with a cellular network and acquire a global positioning signal and provide a visual indication of successful registration and acquisition. In some examples, a sealing device may include one or more lights such as light emitting diodes (LEDs) used to indicate the registration status and acquisition status. A green light may indicate, for example, successful registration with the cellular network. A yellow light may indicate, for example, successful registration with the cellular network but unsuccessful acquisition of the global positioning signal. A red light may indicate unsuccessful registration with the cellular network and unsuccessful acquisition of the global positioning signal. After successful registration and acquisition, a sealing device may send a message with the current geolocation of the sealing device with the device ID and the current date and time then enter (or reenter) a low-power sleep mode as described herein.

Figure 4:
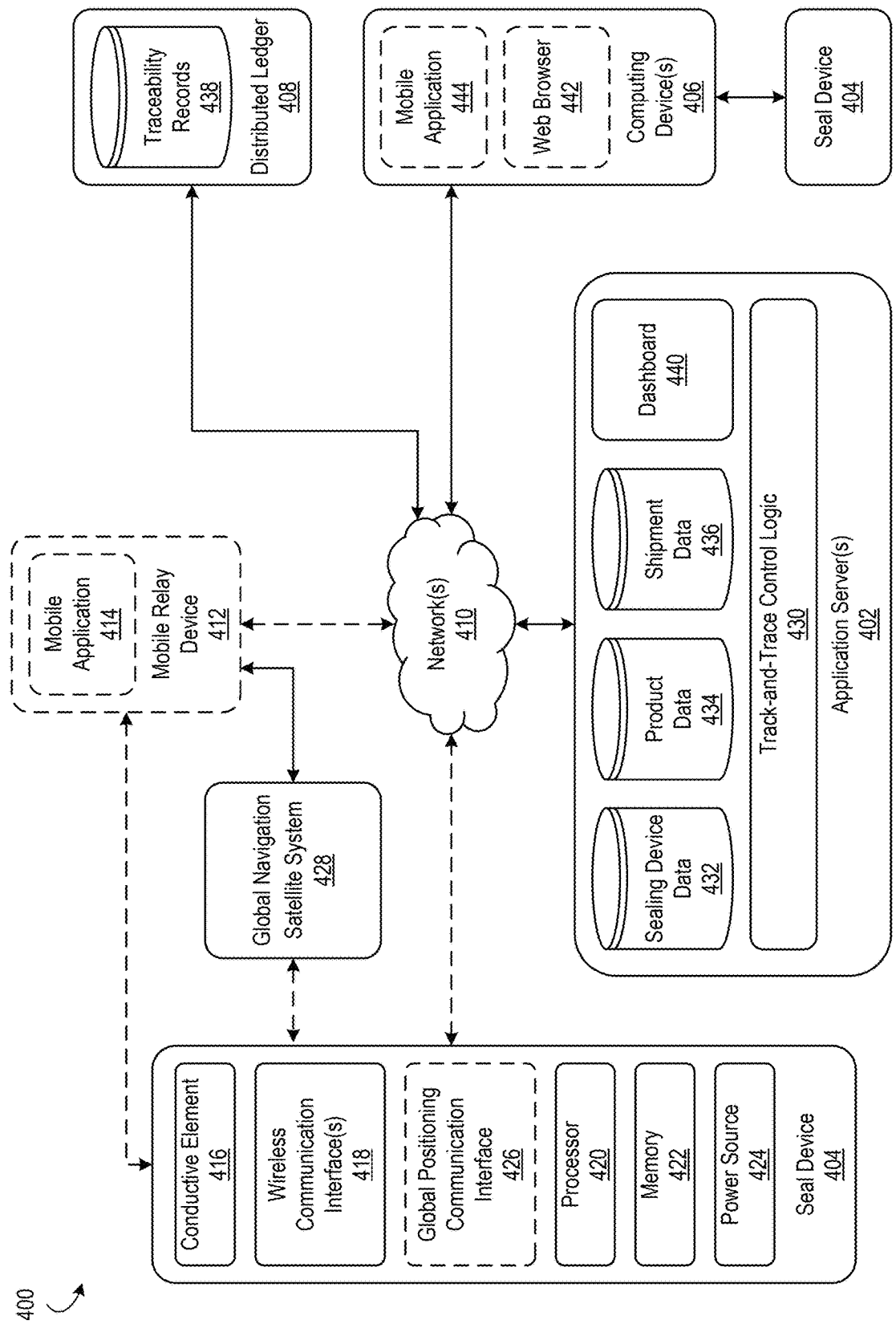
FIG. 4 depicts a block diagram of an example track-and-trace system according to various aspects described herein.

FIG. 4 shows a block diagram of an example track-and-trace system 400. The track-and-trace system 400, in this example, includes one or more application servers 402, one or more sealing devices 404, one or more computing devices 406, and a distributed ledger 408. The application server(s) 402, sealing device(s) 404, and computing device(s) 406 may be in signal communication with each other via one or more networks 410, which may include one or more wide area networks (WANs) such as the Internet, cellular networks, satellite networks, local area networks (LANs), and combinations of such networks. As described above, some sealing device(s) 404 may send messages to the application server(s) 402 directly via a cellular communication network. Additionally or alternatively, in some example implementations (as shown by way of the dashed lines in FIG. 4), some sealing device(s) 404 may send messages to the application server(s) 402 indirectly via a mobile relay device 412. The mobile relay device 412 may be the same as or similar to the mobile relay device 202 described above with reference to FIG. 2. For example, the mobile relay device 412 may include a mobile application 414 that listens for messages sent by the sealing device(s) 404. The sealing device(s) 404 likewise may be the same as or similar to the sealing devices 102, 204, or 300 respectively described above with reference to FIGS. 1-2 and FIGS. 3A-B. For example, the sealing device(s) 404 include a conductive element 416, one or more wireless communication interfaces 418, a processor 420, memory 422, and a power source 424. Some sealing device(s) 404 (as shown by way of the dashed lines in FIG. 4) may include a global positioning communication interface 426 used to obtain the geolocation of the sealing device. The dashed lines in FIG. 4 thus illustrate the different implementations that may be employed to send and receive messages, for example, directly via a cellular network using the wireless communication interface(s) 418 according to a cellular network standard or indirectly via the mobile relay device 412 using a short-range wireless communication standard to trigger the mobile relay device to send the message (e.g., to send a status message with the device ID, current geolocation, and current date and time to the application server(s) 402, to receive a "wake up" message, etc.). As described above, the sealing device(s) 404 and the mobile relay device 412 are in signal communication with a global navigation satellite system 428 to obtain the current geolocation of the sealing devices.

The track-and-trace system 400 may include one application server 402 that performs the track-and-trace operations or multiple application servers that distribute the track-and-trace operations across multiple servers that are interconnected via one or more networks (e.g., WANs, LANs). As noted above, the application server(s) 402 may be implemented as a cloud-based IoT hub. The application server(s) in this example include track-and-trace control logic 430 and one or more data stores that store data associated with the sealing devices, products transported in containers sealed using the sealing devices, and shipments of the products. The application server(s) 402, in this example, thus include sealing device data 432, product data 434, and shipment data 436. Although the sealing device data 432, product data 434, and shipment data 436 are shown as separate data stores in FIG. 4, this data may be stored in a single data store. For example, one or more relational databases may be used to store the sealing device data 432, product data 434, and shipment data 436 with tables and records corresponding to the sealing devices, products, and shipments and with relationships between those records conveying associations between sealing devices, products, and shipments. For example, sealing device records may include the unique device IDs of sealing devices and may be related to shipment records to indicate a sealing device used to seal a container being transported for the shipment. Shipment records may be related to one or more product records to indicate the products being shipped in a container sealed by one of the sealing devices. In some examples, a shipment may include multiple containers each sealed with an individual sealing device. As such, a shipment record also may be related to one or more sealing device records. Product records may be related to other product records to indicate products that are combined in a combination product (e.g., a variety pack, a multi-pack) or products that are ingredients of another product. Product records may also include KDEs for CTEs associated with the product including, for example, TLCs associated with the products. In some examples, CTEs may be stored as separate CTE records that are related to the product records and that include the KDEs for the CTEs.

The track-and-trace control logic 430 may be implemented as one or more software applications and/or services executed by the application server(s). The track-and-trace control logic 430 in configured to implement the track-and-trace operations of the track-and-trace system 400. The track-and-trace operations include, for example, receiving and processing messages received from or triggered by the sealing device(s) 404 (e.g., initial geolocation messages when engaging the sealing devices, intermittent geolocation messages sent during transit, and final geolocation messages sent when removing sealing devices), storing records of tracking events (e.g., on a distributed ledger), analyzing reported geolocations (e.g., to provide notifications and alerts), and provisioning sealing devices prior to using them to seal containers.

The track-and-trace control logic 430 may be configured to perform multiple operations to process a message received from the seal device(s) 404 or a mobile relay device 412. For example, the track-and-trace control logic may be configured to decrypt and authenticate the message (e.g., using symmetric keys, tokens, or certificates). The track-and-trace control logic 430 also may be configured to extract the information included in the message such as, for example, the device ID of the sealing device, the current geolocation, and the current date and time. Extracted information also may include any additional information included in the message such as, for example, information about the contents of the container, about the transport, and/or about the shipment as described herein. In some examples, the track-and-trace control logic 430 may be configured to perform a query or lookup of the product information, transport information, and/or shipment information using the device ID included in the message. For example, the track-and-trace control logic 430 may be configured to query the data store containing the sealing device data 432 to obtain the corresponding record for the sealing device as well as any related product records or shipment records included in the data stores storing the product data 434 and the shipment data 436.

The track-and-trace control logic 430 also may be configured to generate and store records corresponding to messages that memorializes the transition of sealing device(s) 404 between their open and closed states as well as the status updates received during transit. The track-and-trace control logic 430 may be configured to store the records as traceability records 438 on a distributed ledger 408 as shown by way of example in FIG. 4. The distributed ledger 408 may be a public or private distributed ledger. The distributed ledger 408 may be implemented, for example, as a blockchain (e.g., the Ethereum blockchain). The traceability records 438 may include information identifying the sealing device that caused (e.g., sent, triggered) the message, information identifying the products contained in the container and any associated KDEs, information about the shipment and any associated CTEs, and the like. As described above, track-and-trace control logic 430 may obtain the information included in the traceability records 438 from the information sent in the message from the sealing device(s) 404 (or from the mobile relay device 412) and/or from the data stores storing the sealing device data 432, the product data 434, or the shipment data 436 (e.g., based on a query or lookup of the data stores). As noted above, storing the traceability records on a distributed ledger such as a public blockchain provides an immutable history of CTEs (e.g., shipping events, receiving events) that enables reliable and accurate reporting on the shipping, receiving, and transformation of products that move through the supply chain. To ensure privacy, the information included in the traceability records 438 stored on the distributed ledger 408 may be encrypted. In some examples, the traceability records 438 may have a unique record ID (e.g., a smart contract ID), and the track-and-trace control logic 430 may save the record ID in a data store at the application server(s) 402. In some examples, a new traceability record may be created for individual CTEs along the supply chain. In some examples, a single traceability record may be created for a product that may be updated upon each CTE that occurs as the product moves through the supply chain.

The track-and-trace control logic 430 also may be configured to generate notifications and alerts based on messages received from the sealing device(s) 404 (or the mobile relay device 412). For example, the track-and-trace control logic 430 may be configure to generate and send an alert based on a mismatch between the current geolocation indicated in a message received at the application server(s) 402 and an expected geolocation of the product. The track-and-trace control logic 430 may be configured to determine whether a current geolocation matches an expected geolocation, for example, by determining a distance between the two geolocations and comparing the distance to a threshold distance. If the current geolocation is within the threshold distance of the expected geolocation (e.g., within x feet or meters), then the track-and-trace control logic 430 may determine the current geolocation matches the expected geolocation; otherwise the track-and-trace control logic may determine the current geolocation does not match the expected geolocation. The track-and-trace control logic 430 may determine the distance between the two geolocations, for example, by determining a distance between respective pairs of latitude and longitude coordinates or by resolving the two geolocations to an address and determining the distance between the addresses. In this way, the track-and-trace control logic 430 may generate and send an alert if a sealing device is removed at a location other than its intended destination. The track-and-trace control logic 430 also may be configured to generate an alert if the current geolocation deviates from an expected route for the shipment. For example, the shipment data 436 may indicate a route for the shipment between a shipper and a receiver. The track-and-trace control logic 430 may be configured to compare the current geolocation of a message received by the application server(s) 402 while the shipment is in transit and compare that geolocation to locations on the expected route as described herein. The track-and-trace control logic 430 also may be configured to generate and send notifications to indicate that a shipment has left the shipper's premises and/or has been successfully received at a receiver's premises. Notifications and alerts may be sent using any suitable communication means including, for example, electronic mail, text message, popup dialogs, and the like.

The application server(s) 402, in this example, include a dashboard 440 that the computing device(s) 406 may use to invoke the track-and-trace functions. The computing device(s) 406 may include one or more of a web browser 442 or a mobile application 444 used to access the dashboard 440 (e.g., over the Internet or via a LAN). In some examples, a computing device may include either or both of the web browser 442 or mobile application 444 used to access the dashboard 440 as indicated by the dashed lines in FIG. 4. The dashboard 440 may be configured to provide access to the track-and-trace functionality performed by the track-and-trace control logic 430. The dashboard 440 may be configured to provide, for example, reporting functions to generate various types of reports such as, for example, inventory reports, daily production reports, inbound shipment reports, outbound shipment reports, product recall reports, product hold reports, and the like. The dashboard 440 may be configured to define parameters for automatic reports generated on a regular basis (e.g., daily, weekly, monthly). The dashboard 440 also may be configured to provide, for example, search functions to search for information related to sealing devices, products, and shipments. The dashboard 440 may be configured to search based on TLC, sealing device ID, variety pack or multi-pack lot number, raw material, work order, purchase order, fulfillment status, and the like. The dashboard 440 may be configured to filter search results based on product information and/or shipment information, for example, based on origination location (e.g., source location, manufacture location, transformation location), destination location (e.g., receiver location), expiration date, status, customer, and the like. The dashboard 440 may be configured to allow selection of products and/or shipments to recall or hold. The dashboard 440 may be configured to display product information including, for example, shipping progress (e.g., a progress bar indicating a series of shippers and receivers along the supply chain), entities that have handle the product as it moves through the supply chain, geolocations of messages sent by a sealing device used to seal the product in a container for transit through the supply chain (e.g., a visual map indicating the geolocations of all messages sent by a sealing device or mobile relay device associated with the product), recall status or hold status, and the like. The dashboard 440 also may provide the traceability record IDs associated with a sealing device, product, and/or shipment and provide links to the traceability records 438 stored at the distributed ledger 408. The dashboard 440 may navigate to a traceability record based on receiving user input that selects the link associated with the traceability record. The track-and-trace control logic 430 also may provide a ticketing service (not shown) to submit support tickets requesting assistance with issues or problems related to a product or shipment. The dashboard 440 also may be configured to receive user input associated with message sent from the application server(s) 402 to the sealing devices (e.g., sealing device 404). For example, the dashboard 440 may be configured to receive user input that causes the application server(s) 402 to select a sealing device and send a message (e.g., a "wake up" message) to the selected sealing device. In some examples, the application server(s) may be configured to intermittently (e.g., periodically) send messages (e.g., "wake up" messages) automatically to one or more sealing devices. The dashboard 440 may be configured to receive user input that configures the frequency at which the messages are sent to one or more selected sealing devices (e.g., daily, weekly, monthly, or every x time period). In some examples, the application server(s) 402 may be configured to send a message (e.g., a "wake up" message) to a sealing device automatically based on not receiving any status message from the sealing device after a pre-defined or manually defined duration. The dashboard 440, for example, may be configured to receive user input indicating the duration that must elapse before the application server(s) send the message to one or more selected sealing devices. Additional and alternative track-and-trace functionality exposed by the dashboard 440 will be appreciated with the benefit of this disclosure.

The track-and-trace control logic 430 also may be configured to provision the sealing device(s) 404 before using them to seal a container. Provisioning the sealing device(s) 404 may include, for example, assigning a unique device ID to the sealing device. Provisioning the sealing device(s) 404 also may include installing the symmetric keys and/or certificates used for encrypting and authenticating the messages from the sealing devices. Provisioning the sealing device(s) 404 further may include writing product data and/or shipment data to the memory of the sealing devices for inclusion in the messages sent from the sealing devices. The computing device(s) 406 may be configured to connect to the sealing device(s) 404 in order to provision them with information received from the application server(s) 402.

Figure 5:
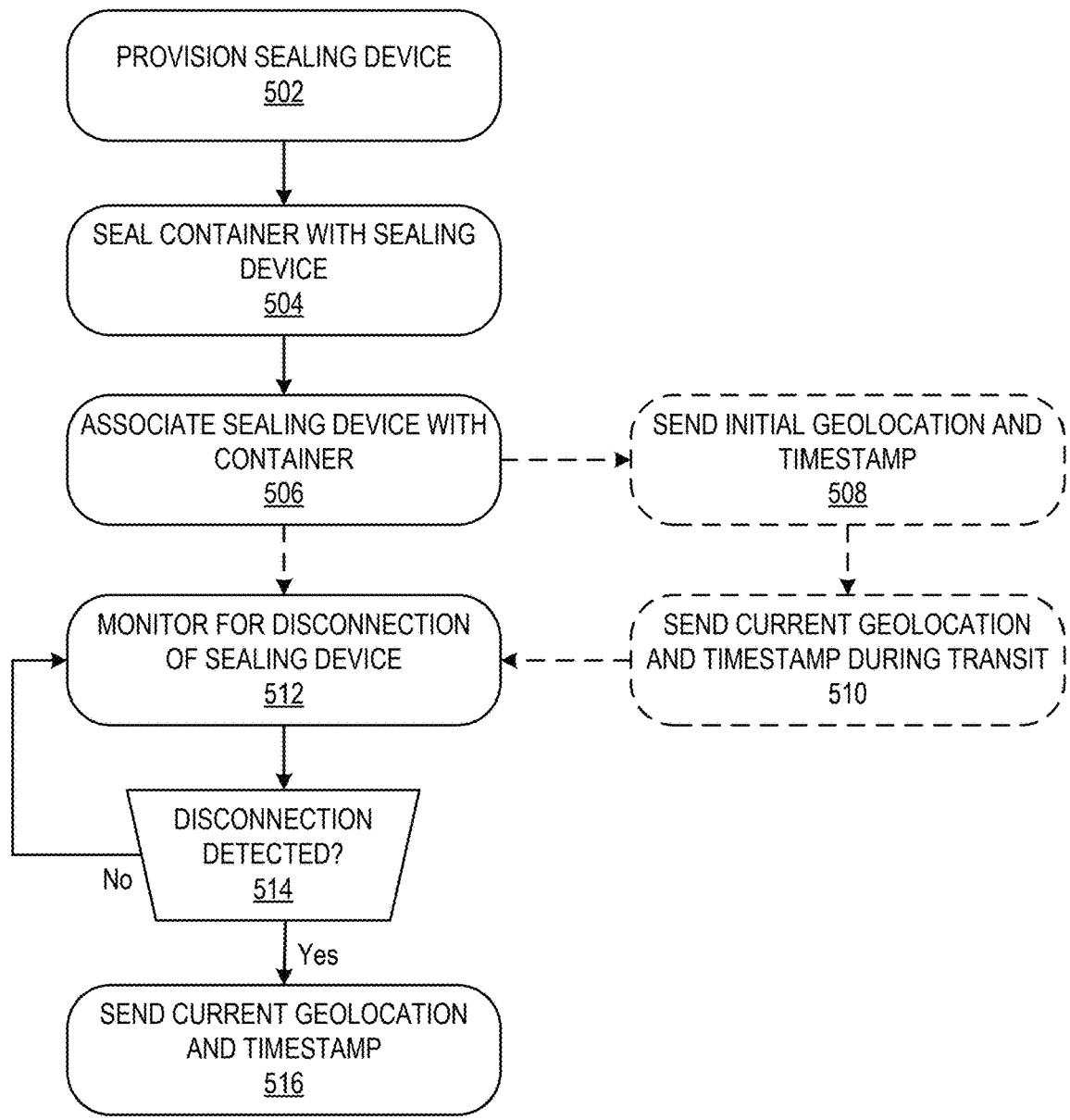
FIGS. 5-8 depict respective flowcharts of example method steps for using a seal device to track the location of a container sealed with the sealing device according to various aspects described herein.

FIG. 5 shows a flowchart 500 of example method steps for using a seal device to track the location of a container sealed with a sealing device as described herein. The flowchart 500 of FIG. 5 illustrates an example implementation whereby the sealing device itself sends a message with a current geolocation via a cellular network. Certain steps of the flowchart 500 thus may be performed, for example, by sealing devices that are the same as or similar to the example sealing devices 102 or 300 as described above with reference to FIGS. 1 and 3 as well as the example sealing device 404 with the global positing communication interface 426 as described above with reference to FIG. 4. To begin, a sealing device may be provisioned (step 502) as described herein, for example, to assign a unique device ID, install symmetric keys and/or one or more certificates, and/or store product data and/or shipment data at the sealing device. A provisioned sealing device then may be used to seal a container (step 504), for example, a shipping container. A provisioned sealing device also may be associated with the container (step 506). Associating the sealing device with the container may include, for example, creating and storing one or more records indicating a relationship between the sealing device and the container (e.g., the sealing device data 432, product data 434, and/or shipment data 436 described above with reference to FIG. 4). It will be appreciated that a sealing device may be associated with a container before or after the sealing device is attached to the container. The association may be initiated, for example, by scanning (e.g., using a handheld scanning device) one or more of the sealing device or the container (e.g., a barcode affixed to or displayed on one or more of the sealing device or container). Scanning the sealing device and/or container may cause display (e.g., on a user interface provided by the dashboard) of information associated with the sealing device, products, and/or shipment (e.g., production date, production location, current location, and/or current status). As described above, and in some implementations, a sealing device may be configured to send an initial message with the current geolocation, date, and time (step 508) based on being attached to the container. As also described above, in some example implementations, a sealing device may be configured to send an intermediate message indicating an intermediate geographic location, date, and time after being attached to the container and before being removed from the container (step 510). It will be appreciated that sending the initial message and the intermediate message may be optional in some example implementations as indicated by use of the dashed lines in FIG. 5. After being attached to the container, the sealing device may monitor for any disconnection of the sealing device (step 512). For example, as described herein, the sealing device may be configured to detect a break in the conductive element of the sealing device (e.g., be detaching its attachment ends or cutting the strap). Based on detecting a disconnection of the sealing device (step 514: Yes), the sealing device may send a message that includes a current geolocation, date, and time (step 516). If no disconnection of the sealing device is detected (step 514: No), the sealing device continues to monitor for a disconnection (step 512).

Figure 6:
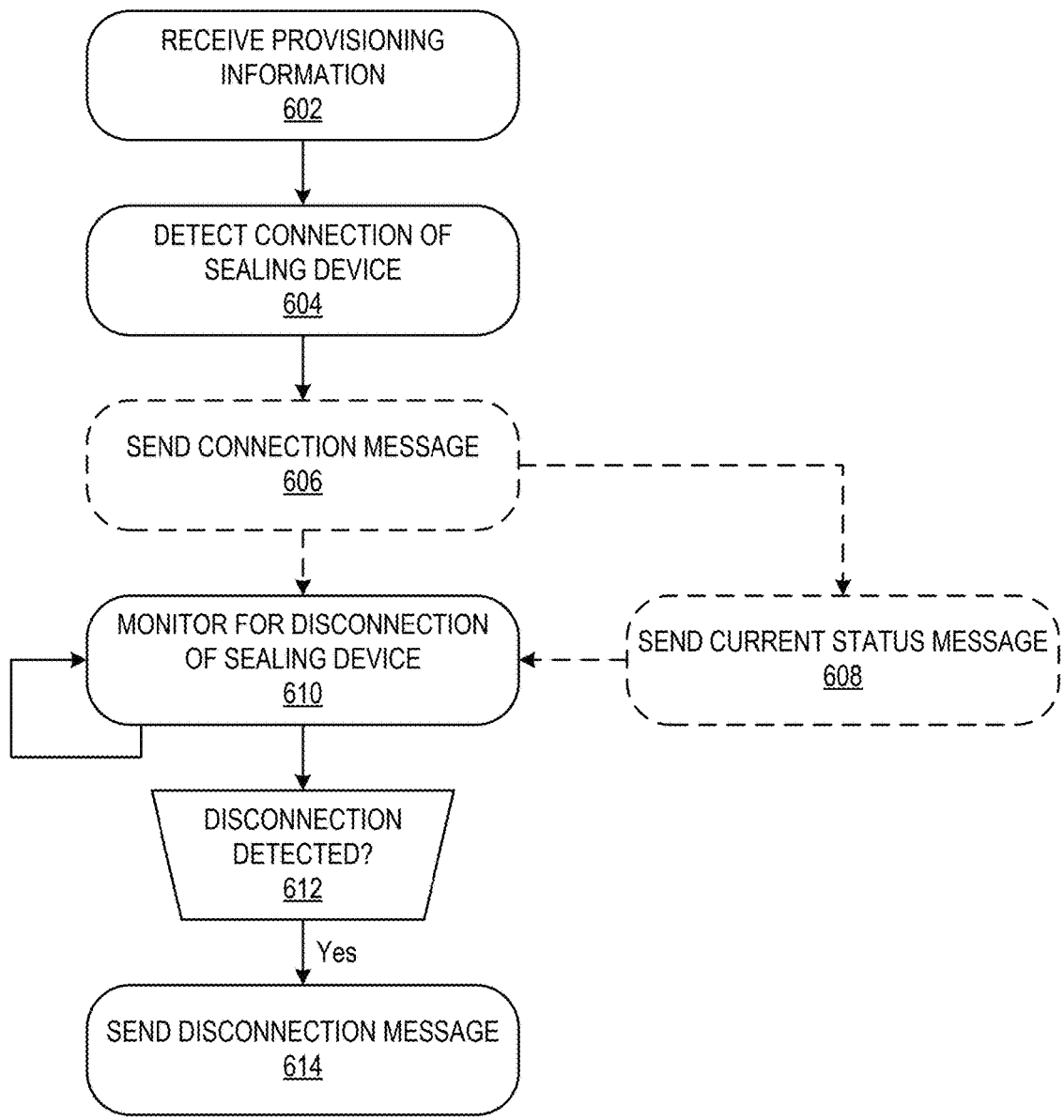

FIG. 6 shows another flowchart 600 of example method steps for using a sealing device to track the location of a container sealed with a sealing device as described herein. The flowchart 600 of FIG. 6 illustrates an example implementation whereby the sealing device itself sends a message with a current geolocation via a cellular network or the sealing device causes a message with a current geolocation to be sent by a mobile relay device. Certain steps of the flowchart 600 thus may be performed, for example, by sealing devices that are the same as or similar to the example sealing devices 102, 204, or 300 as described above with reference to FIGS. 1-3 as well as the example sealing device 404 with or without the global positing communication interface 426 as described above with reference to FIG. 4. Certain steps of the flowchart 600 additionally or alternatively may be performed, for example by the mobile relay device 204 or 412 as described above with reference to FIGS. 1 and 4. To begin, a sealing device may be provisioned (step 602) as described herein, for example, to assign a unique device ID, install symmetric keys and/or one or more certificates, and/or store product data and/or shipment data at the sealing device. A provisioned sealing device may then detect the connection of that sealing device (step 604), for example, when it is attached to and used to seal a container (e.g., by detecting the attachment of the attachment ends of the sealing device). Based on detecting the connection of the sealing device, the sealing device may send an initial connection message (step 606). As described herein, the sealing device itself may send an initial connection message (e.g., via a cellular network according to a cellular network standard) with the current geolocation, date, and time. As also described herein, the sealing device may cause a mobile relay device to send the initial connection message with the current geolocation, date, and time (e.g., by sending a message according to a short-range wireless standard that triggers the mobile relay device to send the initial connection message). The initial connection message from the sealing device, therefore, may or may not include the current geolocation, date, and/or time depending on whether a relay implementation is employed. In some examples, initial connection message from the sealing device may include the current geolocation, date, and/or time even if a relay implementation is employed (e.g., for redundancy to ensure communication of the current geolocation, date, and time for recordkeeping). As also described herein, the sealing device may send intermittent (e.g., periodic) status messages (step 608) after the sealing device is connected to seal a container and before the sealing device is disconnected. Depending on the implementation, the sealing device itself may send the status message with the current geolocation, date, and time (e.g., via a cellular network according to a cellular network standard) or may cause a mobile relay device to send the status message with the current geolocation, date, and time (e.g., by sending a message according to a short-range wireless standard that triggers the mobile relay device to send the status message). It will be appreciated that sending the initial connection message and any subsequent status message(s) may be optional in some example implementations as indicated by use of the dashed lines in FIG. 6. After being attached to the container, the sealing device may continuously monitor for any disconnection (step 610) (e.g., be detaching its attachment ends or cutting the strap). Based on detecting a disconnection of the sealing (step 612: Yes), the sealing device may send a disconnection message (step 614). Again, depending on the implementation, the sealing device itself may be configured to send the disconnection message with the current geolocation, date, and time (e.g., via a cellular network according to a cellular network standard) or may cause a mobile relay device to send the disconnection message with the current geolocation, date, and time (e.g., by sending a message according to a short-range wireless standard that triggers the mobile relay device to send the status message).

Figure 7:
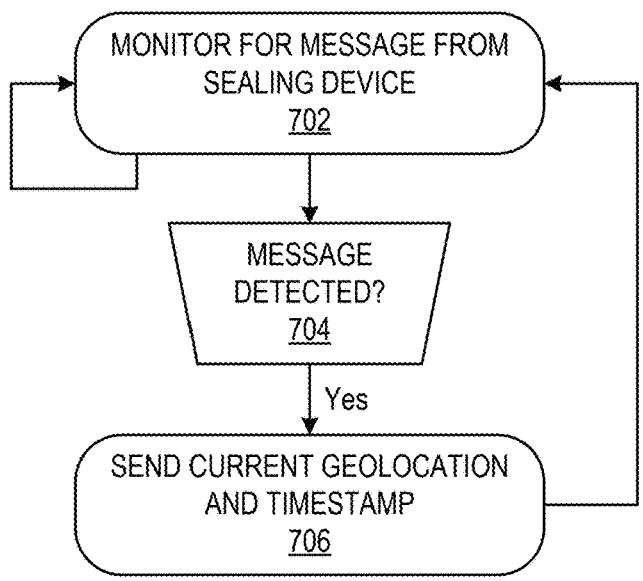

FIG. 7 shows an additional flowchart 700 of example method steps for using a seal device to track the location of a container. The flowchart 700 illustrates an example implementation whereby a mobile relay device within wireless range of a sealing device sends one or more messages with the current geolocation, date, and time via a cellular network based on one or more messages sent by the sealing device itself. The steps of the flowchart 700, therefore, may be performed by mobile relay devices that are the same as or similar to the example mobile relay devices 202 or 412 described above with reference to FIGS. 2 and 4. A mobile relay device may be within wireless range of a sealing device and continuously monitor for a message from the sealing device (step 702). For example, the mobile relay device may include and execute an application or service that listens for messages sent by a sealing device according to a short-range wireless communication standard (e.g., Bluetooth, BLE). As described herein, the messages may include an initial connection message the sealing device sends based on being connected to a container, one or more intermediate status messages the sealing device sends after being connected and before being disconnected, and/or a disconnection message the sealing device sends based on being disconnected. Based on detecting a message sent by the sealing device (step 704: Yes), the mobile relay device may send a message with the current geolocation, date, and timestamp (step 706) as described herein (e.g., via cellular network according to a cellular communication standard). Although not shown in FIG. 7, based on detecting a message sent by the sealing device, the mobile relay device may decrypt the message (if encrypted by the sealing device) and authenticate the message (e.g., using certificates, token-based authentication techniques, and the like) before sending the message with the current geolocation and timestamp. A mobile relay device may perform similar steps to relay messages to a sealing device, for example, messages sent to a sealing from a remotely located application server. For example, a mobile relay device may monitor for messages (e.g., "wake up" messages) received via a cellular network or other type of wireless network (e.g., a WLAN). Based on detecting a received message, the mobile relay device may send a message (e.g., a "wake up" message) to the sealing device using the short-range wireless communication standard.

Figure 8:
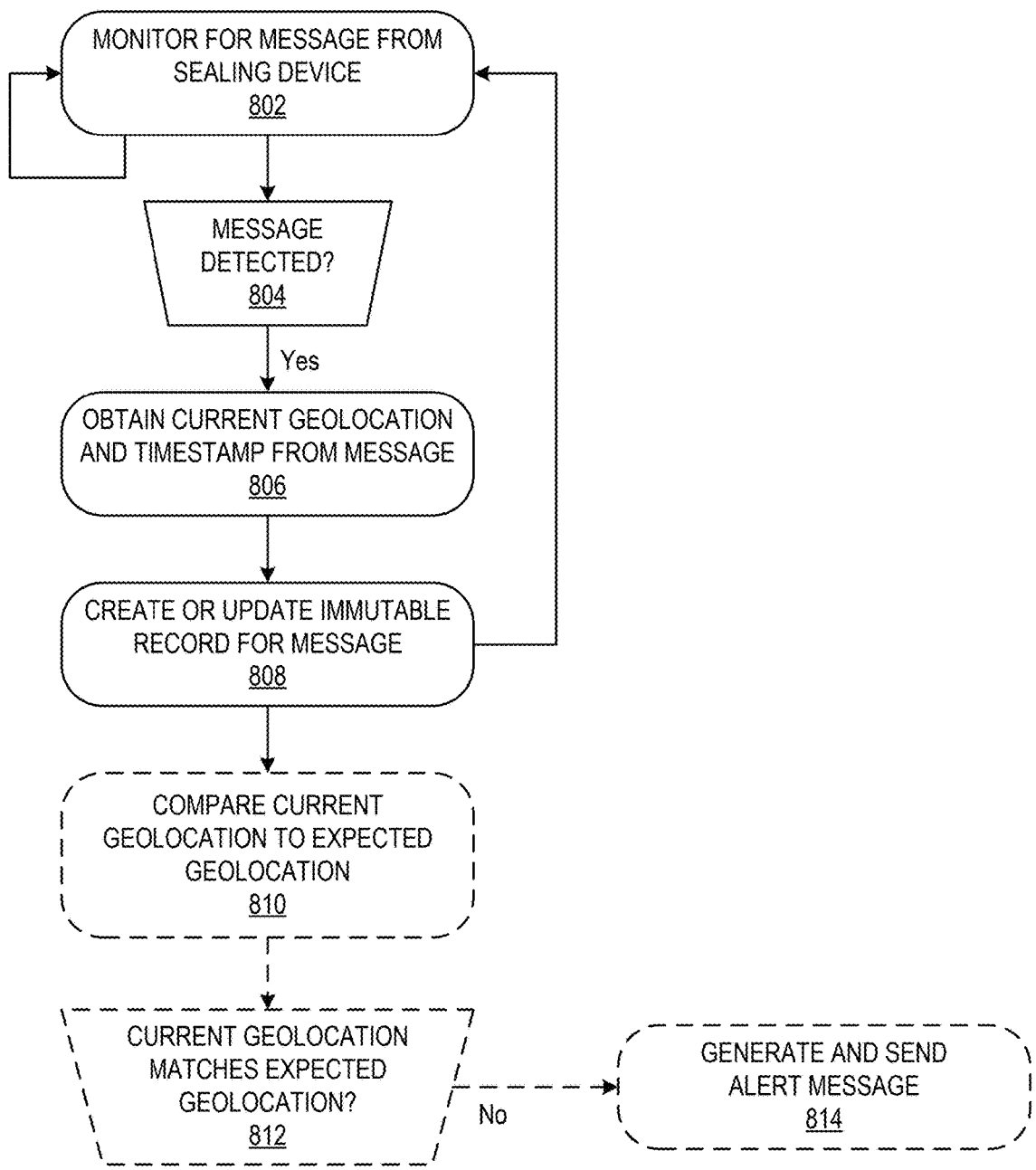

FIG. 8 shows a further flowchart 800 of example method steps for using a seal device to track the location of a container sealed with a sealing device as described herein. The flowchart 800 illustrates an example implementation whereby the messages with the current geolocation, date, and time are sent by the sealing devices themselves or by a mobile relay device. More particularly, the flowchart 800 illustrates example method steps that may be performed by a track-and-trace system for monitoring and recording messages sent by sealing devices as described herein. Certain steps of the flowchart 800 thus may be performed, for example, by one or more computing devices (e.g., one or more application servers) that are the same as or similar to the application server(s) 402 discussed above with reference to FIG. 4. As described above, sealing devices may be provisioned and used to secure containers, such as shipping containers. A computing device of a track-and-trace system (e.g., a web server) may continuously monitor for messages sent by sealing devices used to secure respective containers (step 802). It will be appreciated that messages from sealing devices include both messages sent to the track-and-trace system directly from sealing devices themselves as well as messages sent via mobile relay devices triggered by messages sent from the sealing devices. As described herein, the messages may include an initial connection message the sealing device sends based on being connected to a container, one or more intermediate status messages the sealing device sends after being connected and before being disconnected, and/or a disconnection message the sealing device sends based on being disconnected. Based on detecting a message from a sealing device (step 804: Yes), the computing device may obtain the current geolocation, date, and time from the message (step 806). The computing device also may obtain any additional information included in the message, for example, the unique device ID for the sealing device, product information, shipment information, and the like as described herein. Although not shown in FIG. 8, based on detecting a message from the sealing device, the computing device may decrypt the message (if encrypted by the sealing device) and authenticate the message (e.g., using certificates, token-based authentication techniques, and the like). Having obtained the information included in the message, the computing device may create an immutable record (or update an existing record) for the message (step 808), for example, using a blockchain of a distributed ledger as described herein. In some examples, the computing device also may compare the current geolocation received in the message to an expected geolocation of the sealing device (step 810). For example, the computing device may determine whether a geolocation indicated in a disconnection message sent based on detecting a disconnection of the sealing device matches the expected destination location for a shipment or may determine whether a geolocation indicated in an intermediate status message corresponds to an expected route of a shipment. If the current geolocation indicated in the message does not match the expected geolocation (step 812: No), the computing device may generate and send an alert message (step 814) indicating the mismatch between the two geolocations. The alert may be generated and sent in real-time (or near real-time) with the receipt of the message indicating the current geographic location of the sealing device. In this way, shippers may be notified of potential tampering of or unauthorized access to a container sealed by a sealing device as soon as possible after the sealing device is removed from the container. Similar alerts or notifications may be sent when a shipment is successfully delivered to its intended destination. The track-and-trace system may send a notification of successful delivery based on determining that the current geographic location matches the expected geographic location. As described herein, the computing device may determine the expected geolocation for a product or shipment by querying one or more data stores storing product and/or shipment data. It will be appreciated that comparing the current geolocation indicated in a mismatch to an expected geolocation and generating and sending an alert based on a mismatch may be optional in some example implementations as indicated by use of the dashed lines in FIG. 8.

Figure 9:
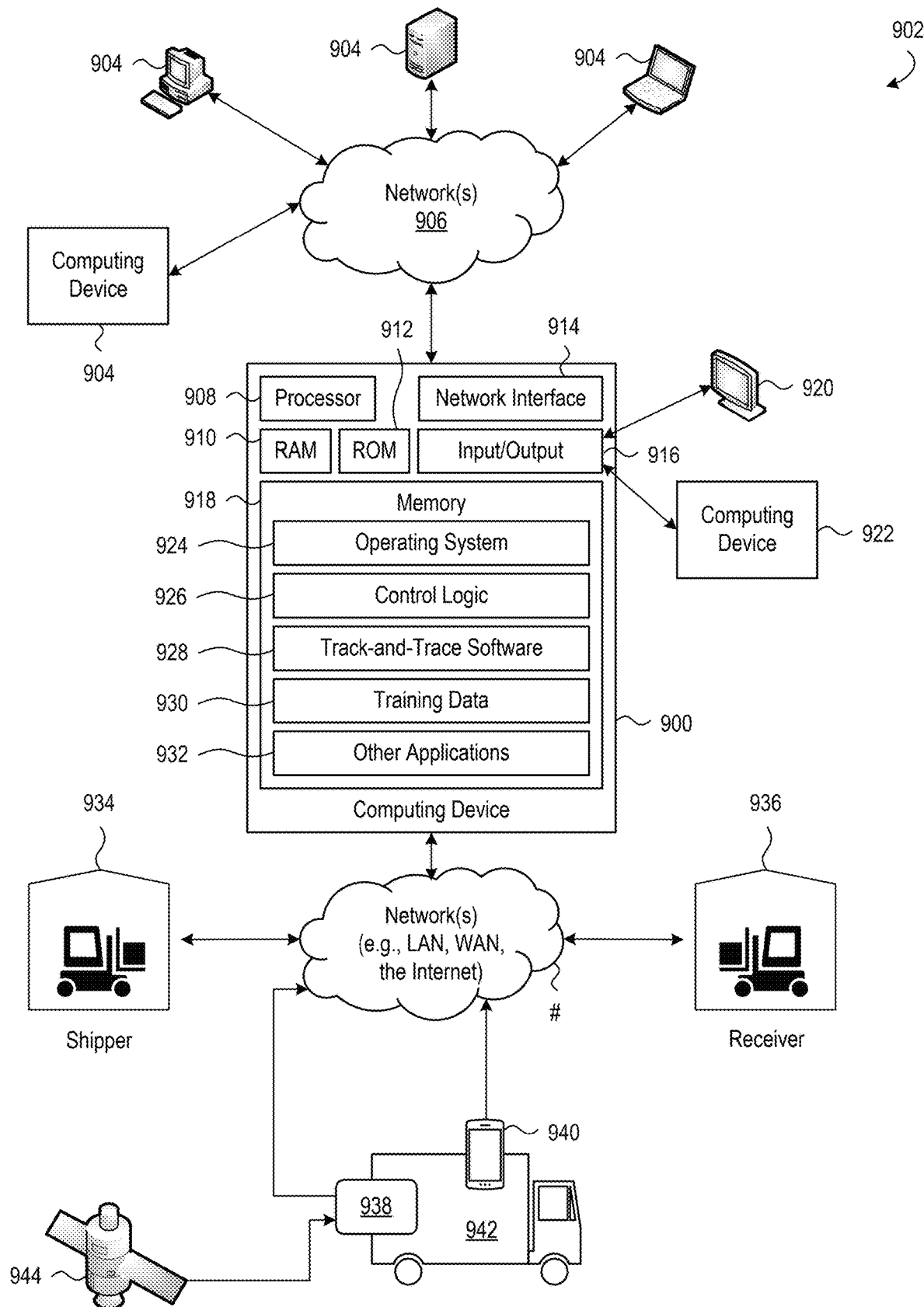
FIG. 9 depicts a block diagram of an example of a computing device that may be used in implementing one or more aspects described herein.

FIG. 9 shows a block diagram of an example of a computing device 900 that may be used in implementing one or more aspects of a track-and-trace system 902 as described herein. For example, a computing device such as the computing device 900 may, in some examples, implement one or more aspects of the disclosure by reading and/or executing instructions and performing one or more actions based on the instructions. The computing device 900 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 900 may, in some examples, operate in a standalone environment. In other examples, the computing device 900 may operate in a networked environment. As seen in FIG. 9, various nodes 904 may be interconnected via a network 906, such as the Internet. Other networks may additionally or alternatively be used, including private intranets, corporate networks, LANs, wireless networks, personal networks (PAN), etc. The network 906 shown in FIG. 9 is for illustration purposes and may be replaced with fewer or additional computer networks. A LAN may have one or more of any known LAN topology and may use one or more of a variety of different protocols, such as Ethernet. The devices shown in FIG. 9 and other devices (not shown) may be connected to one or more of the networks via twisted pair wires, coaxial cable, fiber optics, radio waves or other communication media.

As seen in FIG. 9, the computing device 900 may include a processor 908, RAM 910, ROM 912, network interface 914, input/output interfaces 916 (e.g., keyboard, mouse, display, printer, etc.), and memory 918. The processor 908 may include one or more computer processing units (CPUs), graphical processing units (GPUs), and/or other processing units such as a processor adapted to perform computations associated with tracking cargo shipments and/or analyzing records of cargo shipments using an iterative methodology and/or forms of machine learning. The I/O 916 may include a variety of interface units and drives for reading, writing, displaying, and/or printing data or files. The I/O 916 may be coupled with a display 920 and/or with another computing device 922. The memory 918 may store software for configuring the computing device into a special purpose computing device in order to perform one or more of the various functions discussed herein. The memory 918 may store operating system software 924 for controlling overall operation of the computing device 900, control logic 926 for instructing computing device to perform aspects discussed herein, track-and-trace software 928 configured to perform any of the processes and/or methods described above, training data 930 that is usable to train any or all of the machine-learning models configured for modeling cargo shipments, and other applications 932. The control logic 926 may be incorporated in and may be a part of the track-and-trace software 928. In other examples, the computing device 900 may include two or more of any and/or all of these components (e.g., two or more processors, two or more memories, etc.) and/or other components and/or subsystems not illustrated here.

The other devices and/or systems shown in FIG. 9 may have similar or different architecture as described with respect to the computing device 900. Those of skill in the art will appreciate that the functionality of the computing device 900 (or other computing devices) as described herein may be spread across multiple data processing devices, for example, to distribute processing load across multiple computers, to segregate transactions based on expected parallel processing efficiencies, geographic location, user access level, quality of service (QOS), to use cloud-based computing services, etc. For example, multiple computing devices may operate in concert to provide parallel computing features in support of the operation of the control logic, track-and-trace software, and/or the other applications.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer readable medium such as a hard disk, optical disk, removable storage media, solid state memory, RAM, etc. The functionality of the program modules may be combined or distributed as desired in various embodiments. The functionality also may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

The computing device 900 may be in signal communication with one or more computing devices of a shipper 934 and/or a receiver 936 as described herein. The computing device 900 also may be in signal communication with a sealing device 938 and/or a mobile relay device 940 associated with a transport 942 as also described herein. The sealing device may be in signal communication with a GPS 944 as further described herein. The computing device 900 may be in signal communication with the computing devices of the shipper 934 and/or the receiver 936, the sealing device 938, and/or the mobile relay device 940 via one or more networks 946 including, for example, one or more WANs such as the Internet or a cellular network, one or more LANs, and the like.

It will be appreciated that, although the disclosures herein were presented in the context of certain example use cases, those disclosures may be employed and implemented in other contexts and in other use cases. For example, the disclosures presented herein may be employed to provide track-and-trace functionality for any type of product (e.g., auto parts, consumer goods, and the like) that move through the supply chain or other logistics channels. For example, the disclosures herein may be employed to provide track-and-trace functionality for shipments of goods, packages, and the like transported by public postal services, private shipping services, and the like. Furthermore, the disclosures provided herein may be employed to provide notifications of access to sealed containers whether or not those containers are transported. Additional contexts, use cases, and examples will be appreciated with the benefit of the disclosures herein.

The articles "a" and "an" are used herein to refer to one or to more than one (i.e., to at least one) of the grammatical object of the article. By way of example, "an element" means one element or more than one element. Furthermore, "about" as used herein when referring to a measurable value such as an amount, a temporal duration, and the like, is meant to encompass variations of ±20%, ±10%, ±5%, ±1%, and ±0.1% from the specified value, as such variations are appropriate according to the understanding of one of ordinary skill in the art. Ranges: throughout this disclosure, various aspects of the invention can be presented in a range format. It should be understood that any description in describing a range is provided for convenience and brevity and should not be construed as an inflexible limitation. Where appropriate according to the understanding of one or ordinary skill in the art, the description of a range should be considered to have specifically disclosed all the possible subranges as well as individual numerical values within that range. For example, description of a range such as from 1 to 6 (1-6) should be considered to have specifically disclosed subranges such as from 1 to 3 (1-3), from 1 to 4 (1-4), from 1 to 5 (1-5), from 2 to 4 (2-4), from 2 to 6 (2-6), from 3 to 6 (3-6), etc., as well as individual numbers within that range, for example, 1, 2, 2.7, 3.0, 3.25, 4, 4.675, 5, 5.03, and 6.00 with an appropriate quantity of significant digits according to the understanding of one or ordinary skill in the art. This applies regardless of the breadth of the range.

Although the subject matter has been described in language specific to structural features and/or methodological acts, it is to be understood that the subject matter defined in any statement of example embodiments is not necessarily limited to the specific features or acts described above. Furthermore, the operations described herein may be conditional. For example, various operations may be performed if certain criteria are met. If the one or more criteria are met, various examples may be used. It may be possible to implement any portion of the examples described herein in any order and based on any condition.

Although the subject matter has been described in language specific to structural features and/or methodological acts, it is to be understood that the subject matter defined in any statement of examples is not necessarily limited to the specific features or acts described above. Furthermore, while aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

What is claimed is:

1. A single-use sealing device comprising:
a strap comprising a first free attachment end and a second free attachment end opposite the first free attachment end, wherein the first free attachment end is configured to irreversibly engage with the second free attachment end such that detaching the first free attachment end from the second free attachment end prevents reengagement of the first free attachment end with the second free attachment end;
a conductive element embedded in the strap and extending between the first free attachment end and the second free attachment end with a first terminal end of the conductive element terminating at the first free attachment end of the strap and a second terminal end of the conductive element terminating at the second free attachment end of the strap; and
a housing connected to the strap between the first free attachment end of the strap and the second free attachment end of the strap and comprising a processor and a wireless transmitter in signal communication with the processor;

wherein the processor is configured to:
based on the first free attachment end of the strap engaging the second free attachment end of the strap, begin monitoring for a break in the conductive element; and
based on a break in the conductive element:
cause obtaining of an indication of a current geographic location of the single-use sealing device; and
cause transmission, via the wireless transmitter, of information indicating:
a unique identifier of the single-use sealing device;
the current geographic location of the single-use sealing device; and
a current date and a current time.

2. The single-use sealing device of claim 1, wherein the processor is configured to cause transmission of the information at least by causing the wireless transmitter to transmit a wireless signal comprising the information.

3. The single-use sealing device of claim 1, wherein the processor is configured to cause transmission of the information at least by causing the wireless transmitter to transmit a wireless signal comprising the information according to a cellular network standard.

4. The single-use sealing device of claim 1, wherein the processor is configured to cause obtaining of the indication of the current geographic location and cause transmission of the information at least by causing the wireless transmitter to transmit a wireless signal configured to trigger a wireless device, within wireless range of the single-use sealing device, to obtain the indication of the current geographic location and to wirelessly transmit a wireless signal comprising the information.

5. The single-use sealing device of claim 1, wherein the processor is configured to cause transmission of the information at least by causing the wireless transmitter to transmit a wireless signal comprising the information according to a short-range wireless network standard.

6. The single-use sealing device of claim 1, wherein the processor is configured to cause transmission of one or more signals according to a cellular network standard and configured to cause transmission of one or more signals according to a short-range wireless network standard.

7. The single-use sealing device of claim 1, further comprising a wireless receiver in signal communication with the processor and a global positioning system (GPS), wherein the processor is further configured to receive, via the wireless receiver and from the GPS, the indication of the current geographic location of the single-use sealing device.

8. The single-use sealing device of claim 1, wherein the processor is configured to, based on the first free attachment end engaging with the second free attachment end, cause transmission of information indicating an initial geographic location of the single-use sealing device.

9. The single-use sealing device of claim 1, wherein the processor is configured to, after the first free attachment end engages with the free second attachment end and before any break of the conductive element, cause transmission of information indicating at least one intermediate geographic location of the single-use sealing device.

10. The single-use sealing device of claim 1, wherein the housing further comprises an alkaline battery configured to provide power to the processor and the wireless transmitter.

11. The single-use sealing device of claim 1, wherein the processor is configured to encrypt the information.

12. The single-use sealing device of claim 1, further comprising a circuit wherein the conductive element is configured such that the first free attachment end engaging with the second free attachment end closes the circuit.

13. The single-use sealing device of claim 1, wherein the strap is plastic.

14. The single-use sealing device of claim 1, wherein the information further indicates information associated with contents of a container sealed by the single-use sealing device.

15. The single-use sealing device of claim 14, wherein the information associated with the contents of the container comprises at least one of:
an indication of an identity of the contents;
an indication of an identity of an individual transporting the container;
an indication of a transport transporting the container;
an indication of a departure location of the contents;
an indication of a destination location of the contents; or
an indication of one or more routes between the departure location and the destination location.

16. The single-use sealing device of claim 14, wherein the information associated with the contents of the container comprises at least one of:
a traceability lot code assigned to a food or a beverage;
an indication of a location associated with a source of the traceability lot code;
an indication of a quantity and unit of measure of the food or the beverage;
an indication of a description of the food or the beverage;
an indication of an immediate subsequent receiving location of the food or the beverage;
an indication of a shipping location of the food or the beverage; or
a shipping date of the food or the beverage.

17. A sealing device comprising:
a strap comprising a first free attachment end configured to engage with a second free attachment end of the strap opposite the first free attachment end;
a circuit embedded in the strap and comprising a conductive element extending between the first free attachment end and the second free attachment end with a first terminal end of the conductive element terminating at the first free attachment end of the strap and a second terminal end of the conductive element terminating at the second free attachment end of the strap, wherein the conductive element is configured to close the circuit based on the first free attachment end being engaged with the second free attachment end;
a processor in signal communication with the circuit;
a wireless receiver in signal communication with the processor and in signal communication with a global positioning system (GPS);
a wireless transmitter in signal communication with the processor; and
memory storing instructions that, when executed by the processor, cause the sealing device to:
based on based on the first free attachment end of the strap engaging the second free attachment end of the strap, begin monitoring for a break in the circuit; and
based on a break in the circuit:
obtain, via the wireless receiver and based on a signal received from the GPS, an indication of a current geographic location of the sealing device; and transmit, via the wireless transmitter and according to a cellular network standard, information indicating:
  a unique identifier of the sealing device;
  the current geographic location of the sealing device; and
  a current date and a current time.

18. The sealing device of claim 17, wherein the first free attachment end is configured to irreversibly engage with the second free attachment end such that detaching the first free attachment end from the second free attachment end prevents reengagement of the first free attachment end with the second free attachment end.

19. The sealing device of claim 17, wherein the instructions, when executed by the processor, further cause the sealing device to, based on the first free attachment engaging the second free attachment end:
  obtain, via the wireless receiver and based on a signal received from the GPS, an initial geographic location of the sealing device; and
  transmit, via the wireless transmitter, information indicating:
    the unique identifier of the sealing device;
    the initial geographic location of the sealing device; and
    an initial date and an initial time.

20. The sealing device of claim 17, wherein the instructions, when executed by the processor with the first free attachment end being engaged with the second free attachment end, further cause the sealing device to:
  obtain, via the wireless receiver and based on a signal received from the GPS, an intermediate geographic location of the sealing device; and
  transmit, via the wireless transmitter, information indicating:
    the unique identifier of the sealing device;
    the intermediate geographic location of the sealing device; and
    a current date and a current time.

21. The sealing device of claim 17, wherein the information further indicates information associated with contents of a container sealed by the sealing device.

22. A method comprising:
  by a processor of a single-use sealing device comprising a strap having a first free attachment end and a second free attachment end configured to irreversibly engage with the first free attachment end such that detaching the first free attachment end from the second free attachment end prevents reengagement of the first free attachment end with the second free attachment end:
    detecting engagement of the first free attachment end of the strap with the second free attachment end of the strap;
    based on detecting the engagement of the first free attachment end of the strap with the second free attachment end of the strap, begin monitoring for a disengagement of the first free attachment end from the second free attachment end;
    detecting a disengagement of the first free attachment end of the strap from the second free attachment end of the strap;
    based on detecting the disengagement of the first free attachment end of the strap from the second free attachment end of the strap;
      causing obtaining of an indication of a current geographic location of the single-use sealing device; and
      causing, using a wireless transmitter of the single-use sealing device, transmission of a message indicating:
        a unique identifier of the single-use sealing device;
        the current geographic location of the single-use sealing device; and
        a current date and a current time.

23. The method of claim 22, wherein detecting the disengagement comprises detecting a break in a conductive element embedded in the strap of the single-use sealing device.

24. The method of claim 22, wherein causing transmission of the message comprises transmitting the message via a cellular network according to a cellular network standard.

25. The method of claim 22, wherein causing transmission of the message comprises transmitting, according to a short-range wireless standard, a message that is configured to trigger a computing device, within wireless range of the single-use sealing device, to transmit the message via a cellular network according to a cellular network standard.

26. The method of claim 22, wherein causing obtaining of the indication of the current geographic location comprises receiving, using a wireless receiver of the single-use sealing device, the indication of the current geographic location of the single-use sealing device.

27. The method of claim 22, further comprising, based on detecting the engagement of the first free attachment end with the second free attachment end, causing, using the wireless transmitter, transmission of a message indicating:
  the unique identifier of the single-use sealing device;
  an initial geographic location of the single-use sealing device; and
  an initial date and an initial time.

28. The method of claim 22, further comprising, with the first free attachment end being engaged with the second free attachment end, causing, using the wireless transmitter, transmission of a message indicating:
  the unique identifier of the single-use sealing device;
  an intermediate geographic location of the single-use sealing device; and
  a current date and a current time.

29. The method of claim 22, wherein the message further indicates information associated with contents of a container sealed by the single-use sealing device.

30. The method of claim 22, wherein the strap of the single-use sealing device is plastic.

* * * * *